United States Patent
Boughton et al.

(10) Patent No.: US 10,407,337 B2
(45) Date of Patent: Sep. 10, 2019

(54) METHOD OF MAKING OPTICAL FIBER PREFORM WITH PRESSED SOOT

(71) Applicant: Corning Incorporated, Corning, NY (US)

(72) Inventors: Daniel Robert Boughton, Naples, NY (US); James Gerard Fagan, Painted Post, NY (US); Larry Gleason Hubbard, Jr., Horseheads, NY (US); Ji Wang, Painted Post, NY (US)

(73) Assignee: Corning Incorporated, Coming, NY (US)

(*) Notice: Subject to any disclaimer, the term of this patent is extended or adjusted under 35 U.S.C. 154(b) by 0 days.

(21) Appl. No.: 15/631,808

(22) Filed: Jun. 23, 2017

(65) Prior Publication Data

US 2018/0002217 A1 Jan. 4, 2018

Related U.S. Application Data

(60) Provisional application No. 62/356,954, filed on Jun. 30, 2016.

(51) Int. Cl.
*C03B 37/012* (2006.01)
*C03B 37/014* (2006.01)

(52) U.S. Cl.
CPC ...... *C03B 37/014* (2013.01); *C03B 37/01217* (2013.01); *C03B 37/01222* (2013.01); *C03B 37/01282* (2013.01); *C03B 37/0142* (2013.01); *C03B 2201/06* (2013.01); *C03B 2201/10* (2013.01); *C03B 2203/14* (2013.01); *C03B 2203/30* (2013.01); *C03B 2203/31* (2013.01); *C03B 2203/34* (2013.01)

(58) Field of Classification Search
CPC ................................................ C03B 37/01282
See application file for complete search history.

(56) References Cited

U.S. PATENT DOCUMENTS

| | | | |
|---|---|---|---|
| 5,244,485 A | 9/1993 | Hihara et al. | |
| 8,468,852 B2 | 6/2013 | Dawes et al. | |
| 8,578,736 B2 | 11/2013 | Dawes et al. | |
| 2010/0071421 A1 | 3/2010 | Dawes et al. | |
| 2011/0132038 A1 | 6/2011 | Dawes et al. | |
| 2015/0086784 A1 | 3/2015 | Imoto et al. | |

FOREIGN PATENT DOCUMENTS

JP 06247733 A 9/1994

OTHER PUBLICATIONS

Machine translation of JP 06-247733A (Year: 1994).*
(Continued)

*Primary Examiner* — Cynthia Szewczyk
(74) *Attorney, Agent, or Firm* — Smit Kapadia; Svetlana Z. Short

(57) ABSTRACT

According to some embodiments method for making an optical fiber preform comprises the steps of: (i) placing a plurality of rods with an outer surface having a coefficient of friction $0.02 \leq COF \leq 0.3$ into an inner cavity of an apparatus; (ii) placing particulate glass material in the inner cavity between the rods and an inner wall of the mold cavity; and (iii) applying pressure against the particulate glass material to press the particulate glass material against the plurality of rods.

20 Claims, 17 Drawing Sheets

(56) References Cited

OTHER PUBLICATIONS

Carbide Depot "Coefficient for Static Friction of Steel", http://www.carbidedepot.com/formulas-frictioncoefficient.htm, Mar. 30, 2002 (Year: 2002).*

Micro Plating Inc. MicroSilk (Boron Nitride), https://www.microplating.com/composite-nickel/microslik-boron-nitride.html, Dec. 19, 2013 (Year: 2013).*

International Search Report and Written Opinion PCT/US2017/039628 dated Sep. 11, 2017.

Aranda, Francisco, "Assymetry Maintains Polarization," Laser Focus World, (2002). 5 PGS.

Birch et al., "Fabrication of Polarization-maintaining Fibers Using Gas-phase Etching," Electronics Letters, vol. 18, No. 24, pp. 1036-1038, 1982.

Katsuyama et al., "Reduced Pressure Collapsing MCVD Method for Single-Polarization Optical Fibers," Journal of Lightwave Technology, vol. LT-2, No. 5, pp. 634-639, 1984.

Miyoshi, Solid Lubricants and Coatings for Extreme Environments: State-of-the-art Survey NASA/TM-2007, 23 pgs.

Noda et al., "Polarization Maintaining Fibers and Their Applications," Journal of Lightwave Technology, vol. LT-4, No. 8, Aug. 2006, pp. 1071-1089.

Okoshi et al., "Sidetunnel Fiber: An Appproach to Polarization-Maintaining Optical Waveguiding Scheme," Electronics. Letters, vol. 18, No. 19, pp. 824-826, 1982.

Ramaswamy et al., "Birefringence in Elliptically Clad Borosilicate Single-mode Fibers," Applied Optics, vol. 18, No. 24, pp. 4080-4084, 1979.

Sears and Zemansky. "Chapter 2: Equilibrium" College Physics. 3rd ed. Massachusetts: Addison-Wesley, 1960: pp. 17-37.

Shibata et al., "Fabrication of Polarization-maintaining and Absorption-reducing Fibers," Journal of. Lightwave Technology, vol. LT-I, No. 1, pp. 38-43, 1983.

Stolen et al., "High-birefringence Optical Fibers by Preform Deformation," Journal of Lightwave Technology, vol. LT-2, No. 5, pp. 639-641, 1984.

Stolen et al., "Linear Polarization in Birefringent Single-mode Fibers," Applied Physics Letters, vol. 33, No. 8, pp. 699-701, 1978.

Stolen et al., "Substrate Tube Lithographylithography for Optical Fibers," Electronics Letters, vol. 18, No. 18, pp. 764-765, 1982.

Walker, James S. "Chapter 6: Applications of Newton's Laws" Physics. 2nd ed. New Jersey: Pearson Education, 2004: pp. 137-146.

* cited by examiner

METHOD OF MAKING OPTICAL FIBER PREFORM WITH PRESSED SOOT

This application claims the benefit of priority under 35 U.S.C. § 119 of U.S. Provisional Application Ser. No. 62/356,954 filed on Jun. 30, 2016, the content of which is relied upon and incorporated herein by reference in its entirety.

BACKGROUND OF THE INVENTION

Field of the Invention

The present invention relates generally to methods and apparatus for making optical fiber preforms with a plurality of holes that utilize soot pressing for optical fiber overcladding.

Technical Background

Conventional chemical vapor deposition (CVD) processes, such as outside vapor deposition (OVD) and vapor axial deposition (VAD) processes, for making optical fiber preforms often utilize only a portion of the starting raw material due to limitations in the deposition efficiency of the OVD process. Use of the resulting "waste" silica soot could, therefore, potentially result in significant raw material cost savings.

Accordingly, different methods have been devised to utilize otherwise unutilized silica soot in the production of optical fiber preforms. These methods can suffer from a variety of drawbacks including expensive, complicated, and/or time consuming processing conditions and equipment, and may result in preforms with less than desirable properties such as unacceptable variability with respect to preform density and geometry.

There are a number of optical fiber applications where a plurality of holes or stress rods are used in the cladding to achieve desirable optical properties. The applications include single polarization fibers, polarization maintaining fibers, bend insensitive fibers, photonic crystal fibers, high numerical aperture fibers, multicore fibers and endless single mode fibers.

Single polarization and polarization maintaining fibers typically include a central core and multiple air holes or boron doped stress rods situated within a cladding and near the fiber core. These fibers are often manufactured by an outside vapor deposition (OVD) process in which silica cladding glass is deposited on a glass core cane, for example, through the pyrolysis of octamethyltetrasiloxane. The OVD process is a highly optimized, high yield manufacturing process. However, the formation of the cladding layer is often the rate limiting step in maximizing optical fiber output. Further, it is estimated that as little as 50% of the pyrolysis product of the octamethyltetrasiloxane feedstock is deposited on the glass core canes during deposition of the cladding portion of the optical fiber preform. Silica cladding soot layer is then sintered to create a silica core/cladding glass blank. The single polarization and polarization maintaining fibers are usually manufactured by drilling/machining precise holes inside these core/cladding glass blanks and, and if stress rods are utilized, by inserting the stress rods into these holes. The resultant assembly may be inserted into a silica tube or overcladded, sintered, and then drawn into a single polarization or polarization maintaining optical fiber. However, in order to obtain good optical performance, the dimensions of the drilled holes must be very precise and require a significant amount of post-processing, resulting in an increase in the processing cost of these fibers.

In another set of applications, a plurality of holes are present in the cladding. Such configurations are suitable for photonic crystal fibers or bend insensitive fiber applications. These fibers are generally made using a stack and draw process or by drilling holes in the preform.

In order to further improve optical fiber output and reduce raw material costs and other manufacturing costs, alternative methods of manufacturing optical fibers with a plurality of cores, holes or stress rods situated in the cladding are desirable.

SUMMARY OF THE INVENTION

One aspect of the invention is a method for making an optical fiber preform. According to at least one embodiment the method comprises the steps of:

(I) placing a plurality of rods into a mold cavity of an apparatus, wherein at least one of the plurality of rods is
  a. a graphite rod; or
  b. a metal or a ceramic rod having a coating, the coating comprising at least one of: graphite, graphene, amorphous silicon (a-silicon), amorphous carbon (a-c); xylan fluoropolymer, composites of xylan with other polymers, diamond-like carbon (DLC), boron nitride, molydisulfide (molybdenum disulfide), tungsten disulfide, electroless nickel infused with Teflon, nickel infused with SiC;

(II) placing particulate glass material in the mold cavity between the rods and an inner wall of the mold cavity; and applying pressure against the particulate glass material to press the particulate glass material against the plurality of rods.

According to at least one embodiment s, at least two of the plurality of rods are graphite rods, and wherein at least one of the plurality of rods is a core cane situated therebetween According to at least one embodiment the method includes the steps of:

(I) placing a plurality of rods into a mold cavity of an apparatus, wherein at least one of the plurality of rods is selected from a group comprising of: (i) graphite rod, or (ii) a metal rod or a ceramic rod having a coating thereon, the coating comprising at least one of: graphite, amorphous silicon (a-silicon); amorphous carbon (a-c);

(II) placing or depositing particulate glass material in the mold cavity between the rods and an inner wall of the mold cavity; and (III) applying pressure against the particulate glass material to press the particulate glass material against the plurality of rods.

According to at least one embodiment the method includes the steps of:

(I) placing a plurality of rods placing a plurality of rods into a mold cavity of an apparatus, wherein at least two of the plurality of rods being
  (a) graphite rods; or
  (b) metal rods or a ceramic rods, each of the metal or ceramic rods having a coating thereon, the coating comprising: graphite, graphene, amorphous silicon (a-silicon), amorphous carbon (a-c); Teflon, xylan flouropolymer, composites of xylan with other polymers, diamond-like carbon (DLC), boron nitride, molydisulfide (molybdenum disulfide), tungsten disulfide, electroless nickel infused with Teflon, nickel infused with SiC;

(II) placing particulate glass material in the mold cavity between the rods and an inner wall of the mold cavity; and (III) applying pressure against the particulate glass material to press the particulate glass material against the plurality of rods.

According to one embodiment a method for making an optical fiber preform comprises the steps of:
  placing a plurality of rods into an mold cavity of an apparatus, wherein at least two of the plurality of rods comprise an outer surface with a coefficient of friction COF, and $0.02 \leq COF \leq 0.3$;
  placing particulate glass material in the mold cavity between the rods and an inner wall of the mold cavity; and
  applying pressure against the particulate glass material to press the particulate glass material against the plurality of rods.

According to at least some embodiments $0.05 \leq COF \leq 0.3$.
According to at least some embodiments $0.02 \leq COF \leq 0.2$.
According to at least some embodiments $0.02 \leq COF \leq 0.15$.
According to at least some embodiments $0.05 \leq COF \leq 0.15$.
According to at least some embodiments $0.02 \leq COF \leq 0.12$.
According to at least some embodiments $0.05 \leq COF \leq 0.15$.
According to at least some embodiments $COF \leq 0.1$. According to at least some embodiments $0.05 \leq COF \leq 0.1$.

According to at least one embodiment the coating has a thickness between 0.01 and 100 microns. According to at least one embodiment the coating has a thickness between 0.01 and 20 microns. According to at least one embodiment the coating has a thickness between 0.01 and 2 microns.

According to at least one embodiment, prior to the step of applying pressure against the particulate glass material, the particulate glass material has an average density of from 0.1 to 0.5 grams per cubic centimeter and subsequent to the step of applying pressure against the particulate glass material, the pressurized (pressed) particulate glass material has a density of from 0.6 to 1.2 grams per cubic centimeter. According to at least some embodiments the step of applying pressure is applying radial pressure against the particulate glass material (pressing the particulate glass material in a radial direction, toward the center of the mold cavity, ad/or against the rods). According to some embodiments the apparatus comprises an outer wall and an inner wall, the outer wall surrounding the inner wall and the inner wall surrounding the mold cavity (the inner wall is also referred to herein as the inner wall of the mold cavity); and the pressure is 25 psig to 250 psig applied at least radially inwards against the particulate glass material to press the particulate glass material against the rods.

According to at least one embodiments the method includes the steps of:
  (i) placing a plurality of rods into a mold cavity of an apparatus, wherein at least one of the plurality of rods being: (i) a graphite rod, or (ii) a metal or ceramic rod, the metal or ceramic rod having a coating thereon with a coating thickness between 0.01 and 100 microns, wherein the coating is at least one of: a graphite, graphene, amorphous silicon (a-silicon), amorphous carbon (a-c); xylan flouropolymer, composites of xylan with other polymers, diamond-like carbon (DLC), boron nitride, molydisulfide (molybdenum disulfide), tungsten disulfide, electroless nickel infused with Teflon, nickel infused with SiC;
  (ii) placing particulate glass material in the mold cavity between the rods and an inner wall of the mold cavity; and
  (iii) applying pressure against the particulate glass material to press the particulate glass material against the plurality of rods.

According to at least one embodiments the method includes the steps of:
  (i) placing a plurality of rods into a mold cavity of an apparatus, wherein at least one of the plurality of rods is a core cane situated in a center of the mold cavity, and at least two of the plurality of rods are at least two mold rods, the at least two mold rods are:
    (a) graphite rods; or
    (b) metal or ceramic rods having a coating with a thickness between 0.01 and 100 microns, the coating of the at least two mold rods comprising at least one of: graphite, graphene, amorphous silicon (a-silicon), amorphous carbon (a-c); xylan flouropolymer, composites of xylan with other polymers, diamond-like carbon (DLC), boron nitride, molydisulfide (molybdenum disulfide), and tungsten disulfide, electroless nickel infused with Teflon, nickel infused with SiC; Teflon;
  (ii) placing particulate glass material in the mold cavity between the rods an inner wall of the mold cavity; and
  (iii) applying pressure against the particulate glass material to press the particulate glass material against the plurality of rods.

According to some embodiment the thickness of the coating(s) is between 0.01 and 50 microns, in some embodiments between 0.01 and 20 microns, for example between 0.01 and 2 microns. In at least some embodiments $0.02 \leq COF \leq 0.3$, for example $0.05 \leq COF \leq 0.3$, or $0.05 \leq COF \leq 0.2$ or $0.05 \leq COF \leq 0.15$.

According to at least one embodiment the method includes the steps of:
  (i) placing a plurality of rods into a mold cavity of an apparatus, wherein at least one of the plurality of rods is not situated coaxially with a central axis of the mold cavity and comprises an outer surface with a coefficient of friction $COF \leq 0.3$;
  (ii) placing particulate glass material in the mold cavity between the rods and an inner wall of the mold cavity; and
  (iii) applying pressure against the particulate glass material to press the particulate glass material against the plurality of rods.

In at least some embodiments $0.02 \leq COF \leq 0.3$, for example $0.05 \leq COF \leq 0.3$, or $0.05 \leq COF \leq 0.2$ or $0.05 \leq COF \leq 0.15$.

According to at least one embodiment the method includes the steps of:
  (i) depositing at least two mold rods into a mold cavity of an apparatus, wherein each of the two mold rods comprises an outer surface with a coefficient of friction $COF \leq 0.3$;
  (ii) placing particulate glass material in the mold cavity between the at least two mold rods and an inner wall of the mold cavity; and
  (iii) applying pressure against the particulate glass material to press the particulate glass material against the at least two mold rods.

In at least some embodiments the two mold rods have coefficient of friction, COF, such that $0.02 \leq COF \leq 0.3$, for example $0.05 \leq COF \leq 0.3$, or $0.05 \leq COF \leq 0.2$ or $0.05 \leq COF \leq 0.15$.

According to at least one embodiment the method includes the steps of:
  (i) placing a plurality of rods into a mold cavity of an apparatus, wherein at least two of the plurality of rods comprises a rod with a coating situated thereon, the coating having a thickness of 0.1 to 100 microns (e.g., 0.1 to 2 microns) and an outer surface with a coefficient of friction COF≤0.3;

(ii) depositing particulate glass material in the mold cavity between the rods and an inner wall of the mold cavity; and (iii) applying pressure against the particulate glass material to press the particulate glass material against the plurality of rods. In some embodiments at least two of the plurality of rods have a coating with a thickness of 0.1 to 100 microns and an outer surface with a coefficient of friction COF≤0.3 and preferably <0.2. According to some embodiment the coating thickness is 0.1 to 50 microns, for example 0.1 to 20 microns, or 0.1 to 2 microns.

In some embodiments the coefficient of friction COF≤0.25. In some embodiments COF>0.02. In some embodiments the coefficient of friction COF≤0.2. In some embodiments the coefficient of friction COF≤0.15. In some embodiments COF≤0.12 and in some embodiments COF≤0.1. For example in some embodiments COF may be 0.02 and 0.2, in some embodiments between 0.05 and 0.2, in some embodiments between 0.02 and 0.012, in some embodiments between 0.05 and 0.015, and in some embodiments between 0.05 and 0.012, or between 0.09 and 0.2.

According to at least one embodiment at least one of the plurality of rods is a graphite rod. According to some embodiments at least two of the plurality of rods are graphite rods.

According to at least one embodiment at least one of the plurality of rods is a rod with a graphite coating. According to at least one embodiment at least two of the plurality of rods are rods with a graphite coating thereon. According to some embodiments the graphite coating has a thickness of less than 100 µm, for example not greater than 20 µm, preferably not greater than 2 µm, or even not greater than 0.5 µm. According to some embodiments the graphite coating has a thickness between 0.01 µm and 0.5 µm. According to some embodiment the graphite material has average grain size of ≤15 µm, for example ≤10 µm. For example, the average grain size may be between 3 and 10 µm. According to some embodiments the graphite rods have average graphite grain size of about 7 µm.

According to some embodiments the at least one of the plurality of rods includes a rod with least one of: amorphous silicon (a-silicon); coating an amorphous carbon (a-c) coating. According to some embodiments the amorphous silicon coating (a-silicon) or the amorphous carbon (a-c) coating has a thickness of less than 100 µm, for example not greater than 2 µm, not greater than 1 µm, or even not greater than 0.5 µm. According to some embodiments the amorphous silicon (a-silicon) coating has a thickness between 0.01 µm and 0.5 µm. According to some embodiments the amorphous carbon (a-c) coating has a thickness of less than 100 µm, for example not greater than 2 µm, not greater than 1 µm, or even not greater than 0.5 µm, for example between 0.01 µm and 1 µm.

According to some embodiments the plurality of rods include a glass core cane situated along the axial center of the mold cavity, and at least one mold rod, wherein (i) the mold rod is: a graphite mold rod, or (ii) a mold rod comprises at least one coating with a coating thickness between 0.01 µm and 100 µm (for example, with a coating thickness between 0.01 µm and 20 µm, or between 0.01 µm and 2 µm or between 0.01 µm and 1 µm), the coating comprising at least one of: graphite, amorphous silicon (a-silicon), or the amorphous carbon (a-c).

According to some embodiments the plurality of rods include a glass core cane situated along the axial center of the mold cavity, and at least one mold rod, wherein the mold rod comprises a coating situated on its outer surface, the coating having a coating thickness between 0.01 µm and 100 µm (e.g., between 0.01 µm and 2 µm) and consisting essentially of: graphite, graphene, amorphous silicon (a-silicon); coating, an amorphous carbon (a-c); xylan flouropolymer, composites of xylan with other polymers, diamond-like carbon, boron nitride, molydisulfide (molybdenum disulfide), tungsten disulfide, electroless nickel infused with Teflon, nickel infused with SiC), or a combination thereof.

According to at least one embodiment the method includes the steps of:

(i) placing a plurality of rods into a mold cavity of an apparatus, wherein at least one of the plurality of rods is a graphite rod; (ii) placing particulate glass material in the mold cavity between the rods an inner wall of the mold cavity; and (iii) applying pressure against the particulate glass material to press the particulate glass material against the plurality of rods.

According to at least one embodiment the plurality of rods are at least two mold rods having a coating with the coating thickness between 0.01 µm and 100 µm (e.g., between 0.01 µm and 2 µm), the coating comprising at least one of: graphite, graphene, amorphous silicon (a-silicon); amorphous carbon (a-c); xylan flouropolymer, composites of xylan with other polymers, diamond-like carbon, boron nitride, molydisulfide (molybdenum disulfide), tungsten disulfide, electroless nickel infused with Teflon, nickel infused with SiC, or Teflon (Polytetrafluoroethylene (PTFE)).

According to at least one embodiment the plurality of rods are at least two mold rods having a coating with the coating thickness between 0.01 µm and 100 µm (e.g., between 0.01 µm and 2 µm), the coating consisting essentially of: graphite, or amorphous silicon (a-silicon), amorphous carbon (a-c), or a combination thereof.

According to at least one embodiment the method includes the steps of:
(i) placing a plurality of rods into a mold cavity of an apparatus, wherein at least one of the plurality of rods is a steel rod with a graphite coating of less than 100 µm thick (e.g., less than 20 µm, or even less than 2 µm thick); (ii) placing particulate glass material in the mold cavity between the rods and an inner wall of the mold cavity; and (iii) applying pressure against the particulate glass material to press the particulate glass material against the plurality of rods.

According to at least one embodiment the method includes the steps of:
(i) placing a plurality of rods into a mold cavity of an apparatus, wherein at least one of the plurality of rods is a steel or aluminum rod having a coating situated therein, wherein the coating comprises least one of: amorphous silicon (a-silicon), amorphous carbon (a-c), graphite; (ii) placing particulate glass material in the mold cavity between the rods and an inner wall of the mold cavity; and (iii) applying pressure against the particulate glass material to press the particulate glass material against the plurality of rods. According to at least one embodiment the coating has a thickness of greater than 0.01 µm and less than 100 µm. According to at least one embodiment the coating has a thickness of greater than 0.01 µm and less than 20 µm. According to at least one embodiment the coating has a thickness of greater than 0.01 µm and less than 2 µm.

Preferably the rods are aligned co-linearly with one another. According to some embodiments, preferably, the pressure is applied axially and/or radially. According to some embodiments, the pressure is applied from at least one side of the mold cavity. According to some embodiments the cross-section of the mold cavity is circular. According to some embodiments the cross-section of the mold cavity is does not have circular symmetry.

According to some embodiments, the apparatus comprises an outer wall and an inner wall, the outer wall surrounding the inner wall and the inner wall surrounding the inner cavity (also referred herein as the inner wall of the mold cavity); and the pressure is applied at least radially inwards, and is 25 psig to 250 psig against the particulate glass material to press the particulate glass material against the plurality of rods.

In other embodiments the pressure is applied axially. For example, silica glass soot may be pressed in the axial direction to form a soot compact having a density of at least 0.5 g/cc around the glass core, more preferably at least 0.65 g/cc, and even more preferably to at least 0.75 g/cc. Some exemplary soot densities are, 0.75 g/cc to 1.2 g/cc or 0.8 g/cc to 1.1 g/cc.

According to some embodiments a method of making an optical fiber comprises the steps of:
(I) placing a plurality of rods into a mold cavity of an apparatus, wherein at least one of the plurality of rods is (i) a graphite rod; or (ii) a metal or ceramic rod having a coating thereon, the coating comprising at least one of: graphite, graphene, amorphous silicon (a-silicon), amorphous carbon (a-c); xylan flouropolymer, composites of xylan with other polymers, diamond-like carbon (DLC), boron nitride, molydisulfide (molybdenum disulfide), tungsten disulfide, electroless nickel infused with Teflon, nickel infused with SiC;
(II) placing particulate glass material in the mold cavity between the rods and an inner wall of the mold cavity;
(III) and forming a soot compact by applying pressure against the particulate glass material to press the particulate glass material against the plurality of rods;
(IV) removing at least one of the plurality of rods from the soot compact to form at least one void within the soot compact;
(V) forming an optical fiber preform assembly by inserting at least one glass rod into the at least one void, and x;
(VI) forming the optical fiber preform by sintering the optical fiber preform assembly; and
(VII) drawing an optical fiber from the optical fiber preform.

According to some embodiments a method of making an optical fiber comprises the steps of:
(I) placing a plurality of rods into an mold cavity of an apparatus, wherein at least two of the plurality of rods comprise an outer surface with a coefficient of friction COF, wherein $0.02 \leq COF \leq 0.3$;
(II) placing particulate glass material in the mold cavity between the rods and an inner wall of the mold cavity;
(III) forming a soot compact by applying pressure against the particulate glass material to press the particulate glass material against the plurality of rods;
(IV) removing at least two of the plurality of rods from the soot compact to form at least two voids within the soot compact;
(V) forming an optical fiber preform assembly by inserting glass rods into the voids and;
(VI) forming the optical fiber preform by sintering the optical fiber preform assembly; and
(VII) drawing an optical fiber from the optical fiber preform.

According to some embodiments a method of making an optical fiber comprises the steps of:
(I) depositing a plurality of mold rods into an mold cavity of an apparatus, wherein at least two of the plurality of mold rods comprise an outer surface with a coefficient of friction $0.02 \leq COF \leq 0.3$;
(II) placing particulate glass material in the mold cavity between said plurality of mold rods and an inner wall of the mold cavity;
(III) forming a soot compact by applying pressure against the particulate glass material to press the particulate glass material against the plurality of mold rods;
(IV) removing at least two of the plurality of rods from the soot compact, thereby forming at least two voids within the soot compact, to form an optical preform assembly with at least two voids corresponding to the removed mold rods
(V) forming the optical fiber preform by sintering the optical fiber preform assembly; and
(VI) drawing an optical fiber from the optical fiber preform.

Additional features and advantages of the invention will be set forth in the detailed description which follows.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1A:
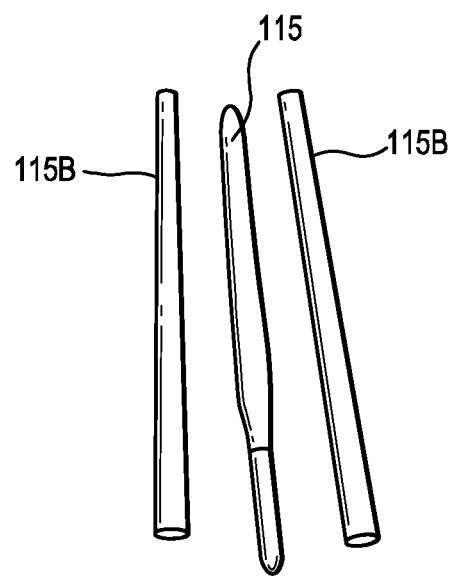
FIG. 1A shows a core cane and two mold rods utilized in one or more embodiments shown and described herein.

Friction is the force resisting the relative motion of solid surfaces against each other, it is typically characterized by the coefficient of friction. Dry friction resists relative lateral motion of two solid surfaces in contact. Dry friction arises from a combination of inter-surface adhesion, surface roughness, and surface deformation. Dry friction may be either static friction between non-moving surfaces, or kinetic friction between moving surfaces. The coefficient of friction $\mu$ is a value that describes the relationship between the force of friction f between two objects and the normal force N between the objects, as shown by the following equation: $f=\mu N$. The coefficient of friction $\mu$ can be a coefficient of static friction (also referred herein as static frictional coefficient, or $\mu_s$) or a coefficient of kinetic friction $\mu_k$. The coefficient of static friction $\mu_s$ defines the friction force between two objects when neither of the objects is moving, and it generally is lower than the coefficient of kinetic friction $\mu_k$. The coefficient of kinetic friction $\mu_k$ defines force between two objects when one object is moving, or if two objects are moving against each other. However, materials with high $\mu_s$ will generally have high $\mu_k$, and conversely materials with low $\mu_s$ will generally have low $\mu_k$. As described herein, unless specified otherwise, the term "coefficient of friction" (also referred to herein as COF) as used herein refers to the coefficient of static friction (i.e., the static frictional coefficient $\mu_s$) More specifically, unless specified otherwise, the value of the coefficient of friction COF for a given material when provided herein is the value of the static frictional coefficient $\mu_s$ that is measured between material and the same material, with non-lubricated surfaces, dry contact, at ambient temperature (22° C.). For example $\mu_s$ for aluminum is 1.05 to 1.35 (aluminum/aluminum surface combination). Also, for example $\mu_s$ for steel (steel/steel surface combination) is about 0.8. Also, for example $\mu_s$ for graphite (graphite/graphite surface combination) is about 0.1.

Reference will now be made in detail to the present preferred embodiments of the invention, examples of which are illustrated in the accompanying drawings. Whenever possible, the same reference numerals will be used throughout the drawings to refer to the same or like parts.

Optical fiber preforms can be manufactured by pressing and pressurizing particulate glass material, such as glass soot, around and against multiple mold rods. We discovered that if these mold rods are typical commercial steel or aluminum rods used for making optical preforms, when these mold rods are withdrawn from the pressed soot, the friction between the mold rods and the surrounding soot results in stresses created in the pressed soot. The surrounding soot can break or form cracks within the soot from the shear force resulting from the withdrawal/removal of the typical mold rods from the pressed soot. These stresses can also lead to undesirable micro-cracking, and also result in the pressed soot surface surrounding the voids that is not sufficiently uniform. We discovered that these defects are largely due to the surface characteristics of the typical commercial steel or aluminum mold rods.

For example, we discovered that when the static frictional coefficient on the outer surface of the mold rods is reduced (for example by utilizing graphite mold rods, or mold rods coated with graphite, an amorphous (a-silicon), or an amorphous carbon (a-c)), xylan flouropolymer, composites of xylan with other polymers, diamond-like carbon (DLC), boron nitride, molydisulfide (molybdenum disulfide), and tungsten disulfide, electroless nickel infused with Teflon, nickel infused with SiC), after the mold rods 115B are removed the result is that the resultant fiber preforms have voids surrounded by glass walls with significantly higher void surface smoothness and surface uniformity than that of optical fiber preforms made with typical steel or aluminum mold rods. That is, after consolidation, the glass wall(s) surrounding/forming the voids formed by the removal of mold rods 115B have high surface uniformity, for example, RMS surface roughers of ≤25 μm and even ≤15 μm, and even ≤10 μm. This results in an optical fiber with better optical characteristics than a fiber made from an optical fiber preform made by a comparative process where typical steel or aluminum mold rods are utilized.

One embodiment of the present invention relates to methods and apparatus for making an optical fiber preform that includes depositing and pressurizing particulate glass material, such as glass soot, around multiple rods. The multiple rods may be, for example, multiple mold rods 115B made from graphite. For example, in order to make a fiber preform for single polarization fiber the multiple rods may comprise a central glass core cane and two graphite mold rods 115B. According to some embodiments the graphite rods have RMS surface roughers of ≤25 µm and even ≤15 µm, and even ≤10 µm. According to some embodiment the graphite material has average grain size of ≤15 µm, for example ≤10 µm. For example, the average grain size may be between 3 µm and 10 µm. According to some embodiments the mold rods 115B have average graphite grain size of about 7 µm.

Alternatively, as described above, at least one (e.g., two, or more) of the multiple mold rods 115B may be manufactured of aluminum or steel (e.g., stainless steel) and coated with either graphite, an amorphous silicon a-silicon, or amorphous carbon (a-c).

According to some embodiments such coating has a thickness of less 100 µm, preferably less 50 µm, more preferably less than 20 µm, and even more preferably less than 2 µm, for example not greater than 1 µm, or even not greater than 0.5 µm. According to some embodiments the graphite coating has a thickness between 0.01 µm and 2 µm, for example between 0.01 µm and 0.5 µm. A thicker coating (>100 µm) would typically generate stress between the coating and its substrate (unless the coefficient of thermal expansion (CTE) of the coating is carefully matched with the CTE of its substrate), which is not desirable because it can result in the portions of the coating shearing off the metal or ceramic material underneath (i.e., its substrate) and/or in microcracks forming within the optical preform. A mold rod comprising graphite, amorphous silicon a-silicon, or amorphous carbon (a-c) coating that is less than 20 µm and preferably less than 2 µm thick will be much less likely to generate microcracks within the optical preform due to thermal (CTE) mismatch. Graphite has a low coefficient of friction. Although graphite has a hexagonal crystal structure with the intrinsic property of easy shear, we discovered that graphite mold rods and graphite coated mold rods do not usually break or shear when the particulate glass material or silica soot is uniformly pressed against them, for example in a radial direction. Furthermore, because graphite easily absorbs moisture or water vapors, such absorption of water can further lower frictional forces between graphite and the surrounding pressed particulate glass material. Thus one can achieve extremely low friction between graphite mold rods (or the mold rods with the graphite coating thereon) and the particulate glass material when such mold rods are removed from the pressed particulate glass material (e.g., pressed silica soot). At temperatures as low as 373 K (100° C.), the amount of water vapor adsorbed may be reduced, so sufficient water vapor may be deliberately introduced prior to removal of the mold rods in order to further reduce the friction between the mold rods and glass soot at such temperatures.

Alternatively, as described above, amorphous silicon (a-silicon), or amorphous carbon (a-c) also have sufficiently low coefficient of friction to be utilized as coatings for the mold rods.

According to at least some embodiments the mold rods 115B have an outer surface with the coefficient of friction COF (static frictional coefficient, or $\mu_s$) of not greater than 0.25, for example 0.02≤COF≤0.25, or 0.05≤COF≤0.25, or 0.05≤COF≤0.1, or even 0.05≤COF≤0.08. According to some embodiments, the multiple rods may include, for example, multiple mold rods 115B with a coefficient of friction such that 0.05≤COF≤0.25 (e.g., 0.05≤COF≤0.1, 0.05≤COF≤0.08, or even 0.05≤COF≤0.07), with the core cane 115 situated therebetween. Preferably, the mold rods 115B have circular cross-sections, but mold rods with other cross-sections may also be utilized. The mold rods may have the same sizes, or may be of different sizes. The exemplary methods and apparatus are suitable making optical fiber preforms and can be utilized for making optical fibers with a plurality of holes or stress rods in the cladding, and utilize soot pressing when manufacturing optical fiber. The examples of optical fiber embodiments that can be made using these exemplary manufacturing methods include: single polarization fibers, polarization maintaining fibers, bend insensitive fibers, multi-core fibers, multi-core fiber ribbons, and photonic crystal fibers.

By core cane what is meant is a consolidated glass rod which includes at least a portion of the core glass of an optical fiber which will eventually be drawn from a preform using the core cane. The core cane may include at least a portion of the cladding glass of an optical fiber which will eventually be drawn from a preform using the core cane. Alternatively, the core cane may be surrounded by a porous soot clad layer.

The mold rods are taken out after the pressurizing (pressing) step is completed (i.e., after the step of pressurizing particulate glass material, such as glass soot, around multiple rods). In some embodiments stress rods may be inserted into the openings or holes left by the withdrawn mold rods 115B. By stress rods what is meant is consolidated glass rod(s) with a different index of refraction and/or different thermal expansion coefficient (CTE) than that of the cladding glass. The stress rods are preferably situated off-center within the preform and may be, for example, boron doped silica (i.e., consolidated B doped silica rods) or silica co-doped with boron and fluorine. The stress rods may, for example, have an overcoat of pure silica, or may be situated inside a silica tube.

According to some embodiments, a method of forming a cladding portion of an optical fiber preform assembly includes positioning a glass core cane 115 and a plurality of mold rods 115B (e.g., either graphite mold rods, or mold rods coated with either graphite, graphene, amorphous silicon (a-silicon); coating, an amorphous carbon (a-c), xylan flouropolymer, composites of xylan with other polymers, diamond-like carbon (DLC), boron nitride, molydisulfide (i.e., molybdenum disulfide), and tungsten disulfide, electroless nickel infused with Teflon, or nickel infused with SiC, or Teflon in a mold cavity of a mold assembly. The particulate glass material, for example silica glass soot, may be loaded into the mold cavity such that the glass core cane and the mold rods are surrounded by particulate glass material (e.g., silica glass soot). The particulate glass material in the mold cavity may be compressed in the axial direction and/or radial direction such that a soot compact is formed around the rods, for example around the glass core cane and the mold rods. The pressed particulate glass material (e.g., soot compact) around the mold rods 115B and/or core rod (or core cane) may have a density of at least 0.5 g/cc (i.e., 0.5 g/cm³), preferably at least 0.6 g/cm³. For example, the density of the pressed (compressed) particulate glass material may be 0.6 g/cm³, 0.7 g/cm³, 0.75 g/cm³, 0.8 g/cm³, 0.9 g/cm³, 1 g/cm³, 1.1 g/cm³, or 1.2 g/cm³. The mold cavity can be designed to affect a desired geometry between the core cane, the mold rods and the outer pressed soot form.

For example, one can utilize mold rods 115B to create air holes in the resultant preform. More specifically, the mold rods 115B are removed from the pressed particulate glass or soot compact (which corresponds to the cladding portion of the preform), leaving voids in the soot compact layer of the preform. The preform can be consolidated such that the voids remain therein, and the resultant soot preform can then be drawn into optical fiber. As described above, the silica glass soot in the mold cavity may be compressed in the axial direction and/or radial direction, such that a soot compact is formed around the mold rods (before they are removed) and/or around the glass core cane. The cross-sectional shape of the mold cavity may be circular, elliptical, or another shape as required to achieve a specific geometric relationship between the different glass rod and the mold rod(s) after consolidation to a glass blank, and after drawing the glass blank to optical fiber.

According to another embodiment, the methods for making an optical fiber preform include depositing and pressurizing particulate glass material, such as glass soot, around a core cane and/or around the (preferably cylindrical) mold rod(s) 115B, as described above. After the mold rods are removed, the soot compact is partially sintered (pre-sintered) by treatment at temperatures between 700° C. and 1100° C. between 1 and 3 hours, which creates a porous soot perform strengthened by the formation of glass necks between the individual particles. After the pre-sintering step, the porous soot preform can be handled more easily. The pre-sintered preform can then be fully sintered to a glass fiber perform using methods well known in the art, or machined to a desired shape and subsequently sintered.

In addition, in this and other embodiments, a core mold rod, instead of the core cane may be placed, for example, at the center of the mold cavity. Such a core mold rod may be, for example, a graphite mold rod, or a mold rod comprising a coating that is made essentially of: graphite, an amorphous silicon a-silicon), or amorphous carbon (a-c), or a combination thereof. The additional mold rod(s) are also placed in the mold cavity, and the particulate glass is then pressed (pressurized or compressed) forming a pressed particulate glass (e.g., soot compact). According to some embodiments, the central (core) mold rod is then removed and a core cane is then inserted into the resulting void or hole, before sintering. The core mold rod may or may not be of the same cross-sectional shape or size as the other mold rods. For example, in some embodiments, a core mold rod may have a smaller diameter than the adjacent mold rods that are used to create voids for subsequent insertion of the stress rods.

According to other embodiments, all mold rods 115B are removed and core canes are inserted into the resulting voids, in order to manufacture multicore fiber preforms for making multicore fibers.

According to some embodiments, the method for making an optical fiber preform includes the steps of depositing and pressurizing particulate glass material, such as glass soot, around a core cane and a plurality of mold rods. That is, one can utilize mold rods 115B to create a plurality of air holes in the resultant preform. More specifically, the mold rods 115B are removed from the pressed particulate glass (e.g., soot compact which corresponds to the cladding portion of the preform), leaving voids in the resulted pressed layer of the preform. The number of voids can be, for example, greater than 5, for example greater than 50, or greater than 100 and even greater than 200. The preform can be consolidated such that the plurality of voids remains therein, and the resultant soot preform can then be drawn to optical fiber that contains a region with a plurality of voids: for example, a low band loss fiber, or a photonic crystal fiber. As described above, the silica glass soot in the mold cavity may be compressed in the axial direction and/or the radial direction such that a soot compact is formed around the glass core cane and the mold rods 115B. The void carrying region may comprise only part of the cladding. For example, the cladding may comprise an inner region with a plurality of voids, with the outer region being void free. In that case, additional glass/soot deposition step may be needed to make the rest of the cladding.

According to yet another embodiment of the present invention, the methods and apparatus for making an optical fiber preform that include (i) depositing and pressurizing particulate glass material, such as glass soot, around a core cane and (preferably cylindrical) mold rod(s) 115B; and (ii) upon removal of mold rods 115B, situating another material in the resulting voids (holes). That is, as described above, one can utilize mold rods to create air holes in the resultant preform. More specifically, the mold rods are removed from the pressed particulate glass or soot compact (which corresponds to the cladding portion of the preform), leaving voids or holes in the resulting pressed layer of the preform, and these holes are then filled with another material.

In one example of this embodiment, these voids are then filled with a second particulate glass composition, such as boron doped silica soot (e.g., in order to create boron doped stress rods). The preform assembly comprising core cane, boron doped soot and the pressed overclad material (soot compact) is sintered such that the overclad material and boron doped soot obtain complete densification. The resultant consolidated preform can then be drawn to produce a single polarization fiber, or a polarization maintaining fiber. The boron doped silica preferably contains between 5% and 25% boron oxide, and more preferably between 15% and 22% boron oxide, to provide a stress field sufficient to be useful in polarization maintaining fiber designs. Preferably the boron doped silica powder has a tap density of between 0.4 and 1.0, preferably within 0.1 g/cc of the density of the final pressed silica soot body.

In another exemplary embodiment the preform made with voids can be consolidated directly to glass, resulting in a consolidated glass blank with voids geometrically aligned relative to the core cane. The voids can be filled with a number of materials, including glass rods or powders, metallic rods, wire or powders, and semiconducting rods or powders. The blank filled with a second phase may be re-consolidated, re-drawn to a smaller diameter cane, or drawn to fiber.

The particulate glass material may be undoped silica, or the particulate glass material may be doped. Potential dopants include at least F, B, Ge, Er, Ti, Al, Li, K, Rb, Cs, Cl, Br, Na, Nd, Bi, Sb, Yb and combinations thereof. The particulate glass material may be left over spray soot or otherwise left over soot from a CVD process ("CVD waste soot"), such as left over soot from an OVD process ("OVD waste soot") or left over soot from a VAD process ("VAD waste soot"), or glass soot from any other silica source, such as sand, or mixtures of glass soots of different type, or mixtures of sand and glass soot.

The particulate glass material can be untreated (e.g., silica soot or CVD waste soot containing no additional coagulants or solvents) or may be treated with one or more coagulants or solvents, such as water or an organic solvent. In some preferred embodiments, the particulate glass material is untreated. Preferably, the particulate glass material has an average tap density of from 0.05 to 0.5 grams per cubic centimeter, even more preferably of from 0.1 to 0.5 grams per cubic centimeter, such as from 0.3 to 0.5 grams per cubic centimeter, for example about 0.38 grams per cubic centimeter.

Metals that may be utilized for inclusion into voids of a consolidated preform and then drawn into a geometrically designed array around a central core cane may include Cu, Ag, Au, W and Ga. These may be included into voids of a consolidated preform and then drawn into a geometrically designed array around a central core cane include materials such as, for example, $Si_3N_4$ and $Si_3N_4/SiC$.

Reference will now be made in detail to the various exemplary embodiment(s), examples of which are illustrated in the accompanying drawings. Whenever possible, the same reference numerals will be used throughout the drawings and description to refer to the same or like parts.

Figure 1B:
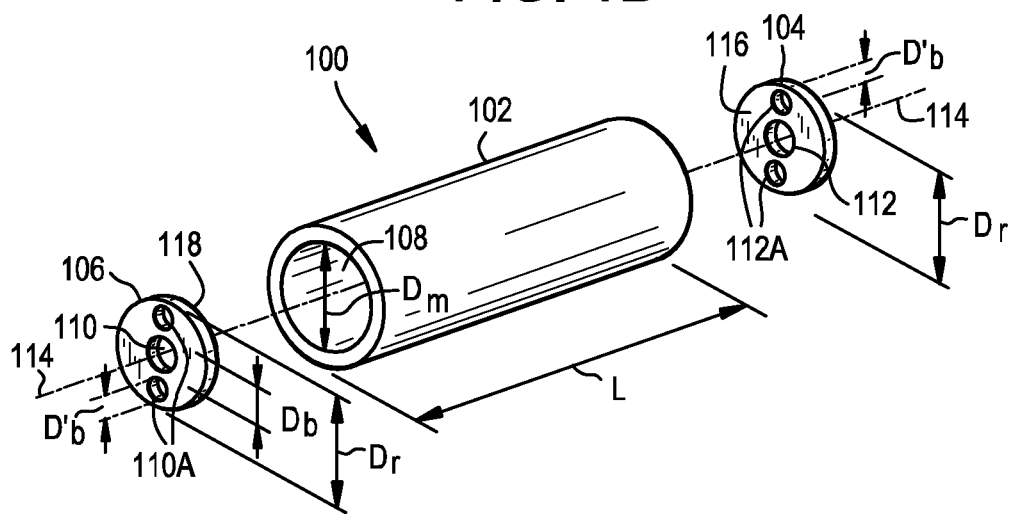
FIG. 1B is a schematic depiction of a mold assembly for forming optical fiber preforms according to one or more embodiments shown and described herein.

Referring to FIG. 1B, an exemplary mold assembly 100 for forming an optical fiber preform assembly comprises a mold body 102, a lower ram 104 and an upper ram 106. The mold body 102 defines a mold cavity 108 centered on and extending along the long axis 114 of the mold body 102. The mold cavity 108 may be cylindrical with a diameter D. and a length L. The mold body 102 may comprise a rigid, inelastic material such as carbon, aluminum, steel, silicon aluminum oxynitride, silicon carbide or other, similar mechanically durable materials. In one embodiment, the mold body 102 may be formed as a single piece, as shown in FIG. 1B. It is noted that mold assemblies with non-circular cross-sections may also be utilized. For example, the mold cavity 108 may be rectangular or elliptical in cross-section.

Figure 1C:
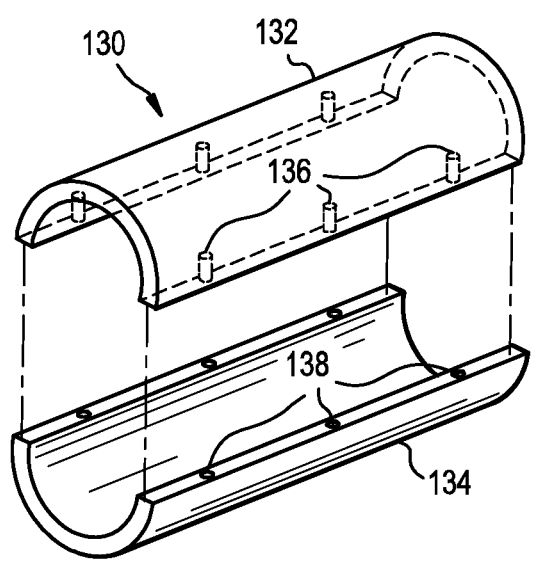
FIG. 1C depicts schematically a segmented mold body for forming optical fiber preforms according to one or more embodiments shown and described herein.

Referring now to FIG. 1C, another embodiment of a mold body 102 is shown. In this embodiment, the mold body 102 extends along an axial direction. In the embodiment shown, the mold segments 132, 134 may be fastened together by inserting fasteners through fastener holes 136 positioned along the edge of the mold segment 132 and into corresponding threaded holes 138 positioned along the edge of mold segment 134. However, it should be understood that the mold segments may be joined together using a variety of other fasteners and/or fastening techniques. For example, mold segment 132 may be coupled to mold segment 134 using one or more bands (not shown) which extend around the circumference of the assembled segments thereby securing mold segment 132 to mold segment 134. It is also noted that the lower ram 104 and the upper ram 106 may also be utilized with the embodiment of the mold body 102 shown in FIG. 1C.

According to one or more embodiments mold body 102 defines a mold cavity 108 centered on and extending along the long axis 114 of the mold body 102 for a length L. The cross-sectional shape of the mold cavity 108 may be circular or non-circular (for example, elliptical, hexagonal, irregular (e.g., D shaped) or other designed shape to obtain the desired ultimate geometry of the optical fiber. The mold cavity 108 may be formed in either a single part or may have a segmented configuration.

Still referring to FIG. 1C, the segmented mold body 130 may be lined with a material (not shown) such that the interior surface of the segmented mold body 102 is substantially continuous. In one embodiment, the lining material may comprise a low-friction polymeric material such as polytetrafluoroethylene (PTFE) or a similar material. In another embodiment, the lining material may comprise non-polymeric low friction materials such as carbon sheet or similar materials. The lining material may comprise a sheet of lining material positioned against the wall of the mold cavity 108 or a coating applied to the mold cavity 108. The lining may also correspond to the material for the inner wall of the mold cavity that is described later on in the specification, to enable application of the radial pressure to a partially compressed preform. This lining material can be made of any material that has sufficient elasticity and yield strength to sufficiently elastically deform radially inwardly without suffering plastic deformation when subjected to the maximum normal operating pressures in the cavity, for example a tube made of a latex material. However, the lining material may correspond to the inner wall, which will be discussed further in detail herein. The inner wall forms walls of the inner cavity (mold cavity) of the mold assembly 100. Such mold cavity may provide for both radial and axial pressure applications using the same mold assembly 100.

It should be understood that, while FIG. 1C depicts the segmented mold body 130 as comprising two mold segments 132, 134, the segmented mold body 130 may comprise three or more mold segments which, when joined together, generally defining a cylindrical mold cavity.

The diameter $D_m$ of the mold cavity 108 and the length L of the mold cavity 108 are generally selected to arrive at the desired final dimensions of the fully consolidated optical fiber preform made according to the soot pressing method described herein. For experimental purposes (e.g., to form a laboratory scale optical fiber preform) mold cavities with diameters of 44 mm, 48 mm, and 89 mm and a length of 61 cm are used to form laboratory scale optical fiber preforms having outer diameters after consolidation from about 3.3 cm (using a 44 mm diameter mold cavity) to less than about 7 cm (using an 89 mm diameter mold cavity). However, it should be understood that dimensions of the mold body 102 and the mold cavity 108 may be upwardly scaled to produce larger optical fiber preforms for use in the commercial production of optical fiber. For example, to produce a larger, production ready optical fiber preform, the diameter of the mold cavity 108 of the mold body 102 may be on the order of 20 cm which may yield an optical fiber preform having an outer diameter on the order of 15 cm following consolidation. Further, the length of the mold cavity may be on the order of 2 m or greater. Criteria for selecting the diameter of the mold cavity to achieve the desired optical fiber preform dimensions will be discussed further herein.

Referring again to FIG. 1B, the lower ram 104 and upper ram 106 are generally disc-shaped and have an outer diameter $D_r$. The outer diameter $D_r$ of the rams 104, 106 may be substantially the same as the diameter $D_m$ of the mold cavity 108 such that the rams 104, 106 may be positioned in the mold cavity 108 and may be slidably positioned relative to one another along the long axis 114 of the mold body 102. The rams 104, 106 may be made of metal, such as aluminum or steel, or plastic or any other material having suitable durability. Each of the lower ram 104 and upper ram 106 may comprise a (core) bore 112, 110, respectively, extending through the center of the ram such that, when the rams 104, 106 are positioned in the mold cavity 108, the bores 112, 110 are centered on the long axis 114 of the mold body 102. Each bore 112, 110 may have a diameter $D_b$ which generally corresponds to the diameter of a glass core cane 115 used for making the optical fiber preform assembly, which will be described in further detail herein.

According to at least some embodiments, each of the lower ram 104 and upper ram 106 may also comprise one or more bore(s) 112A, 110A, respectively, extending through the rams such that, when the rams 104, 106 are positioned in the mold cavity 108, the bores 112A, 110A are situated off-axis with respect to the long axis 114 of the mold body 102. Each bore 112A, 110A may have a diameter $D'_b$ which generally corresponds to ether the diameter of a mold rod 115B used for making the optical fiber preform assembly, which will be described in further detail herein. However, in some alternative embodiments, the bores 112, 110, and/or 112A, 110A do not have a circular cross-section. In these alternative embodiments the dimensions and shapes of the bores 112A, 110A are preferably the same as the dimensions and shapes of the bore(s) 112, 110. For example, oval bores may allow the mold rods 115B to move under applied radial pressure, if such movement is desirable (in some embodiments, for example, both radial and axial pressure is applied to the particulate glass). In addition, in some embodiments, the mold rods may not have a circular cross-section.

As shown in FIG. 1B, the rams 104, 106 each comprise an interior surface 116, 118, respectively. The interior surfaces 116, 118 are opposed to one another when the rams 104, 106 are positioned in the mold cavity 108. In the embodiment shown in FIG. 1B, the interior surfaces 116, 118 of the rams 104, 106 are generally planar. However, it should be understood that the interior surfaces 116, 118 of the rams 104, 106 may comprise other surface geometries. For example, in some embodiments, the interior surfaces 116, 118 of the rams 104, 106 may be conically tapered or parabolically shaped in order to shape the end portions of the soot compact formed by compressing silica glass soot between the rams 104, 106 in the mold cavity 108 to improve the shape retention of the soot compact upon sintering. Moreover, the interior surfaces 116, 118 of the rams 104, 106 may have a parabolic geometry to optimize reflection and/or dissipation of vibratory energy introduced into the mold cavity 108 through the mold body 102.

Figure 2:
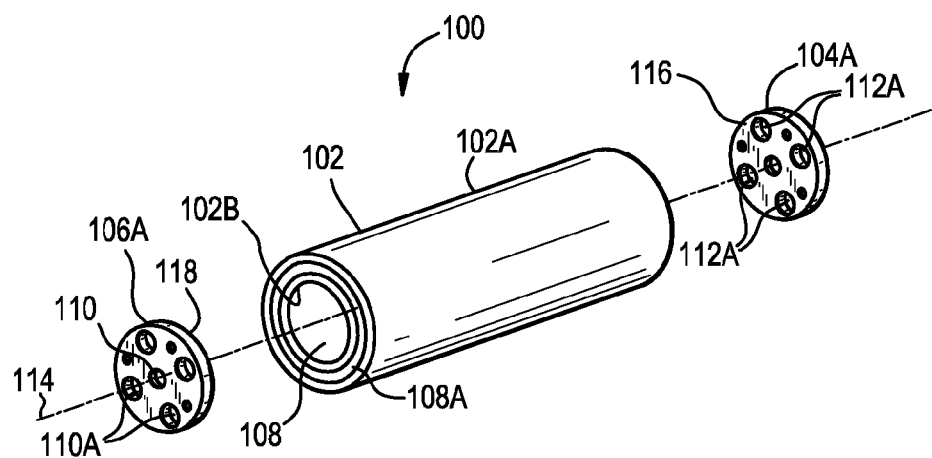
FIG. 2 is a schematic depiction of a mold assembly for forming optical fiber preforms according another embodiments shown and described herein.
Figure 3A:
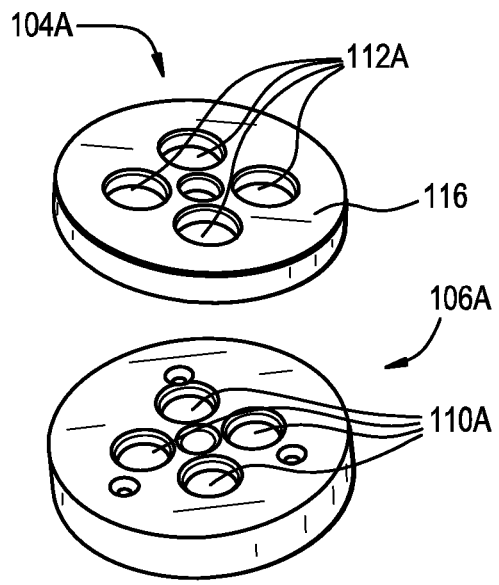
FIG. 3A illustrates an exemplary embodiment of lower and upper mold rod/cane holder.

Referring to FIG. 2, an exemplary mold assembly 100 for forming an optical fiber preform assembly by use of radial pressure comprises a mold body 102 (shown schematically in FIG. 2) with a rigid outer wall 102A, a flexible inner wall 102B, a bottom end cap 104A (also referred to herein as the bottom or lower mold rod/cane holder) and a top end cap 106A (also referred to herein as the upper mold rod/cane holder), and as well as an optional holding fixture 105'. The bottom end cap 104A (i.e., the lower mold rod/cane holder) and the top end cap 106A (i.e., the upper mold rod/cane holder) are similar to the lower and upper rams 104, 106, but they do not move axially to compress soot. In this embodiment, the inner wall 102B exerts radial pressure on the particulate glass material (e.g., silica soot) situated inside the mold cavity 108, pressing it against the mold rods 115B during the pressing step. A more detailed description of at least one embodiment of the mold body 102 utilized for applying radial pressure is disclosed further in the specification. FIG. 3A illustrates another embodiment of the lower and upper mold rod/cane holders (end caps 104A, 106A). As shown in FIG. 3A, according to at least some embodiments, each of the end caps 104A and 106A may comprise one or more bore(s) 112A, 110A, respectively for positioning the mold rods 115B of specified dimension therein, in the specified configuration, such that, when the end caps 104A, 106A are positioned in the mold cavity 108, at least some of the bores 112A, 110A are situated off-axis with respect to the long axis 114 of the mold body 102. Each bore 112A, 110A may have a diameter $D'_b$ which generally corresponds to the diameter of a mold rod 115B used for making the optical fiber preform assembly, which will be described in further detail herein. However, in some alternative embodiments, the bores 112A, 110A do not have a circular cross-section.

In these alternative embodiments the dimensions and shapes of the bores 112A are preferably the same as the dimensions and shapes of the bore(s) 110A. The lower mold rod/cane holder 104A (i.e., the bottom end cap) is mounted on the bottom of the mold assembly 100, for example on the bottom of the radial press mold assembly 100. The upper mold rod/cane holder 106A is mounted near the top portion of the mold assembly, for example near the top portion of the radial press.

Figure 3B:
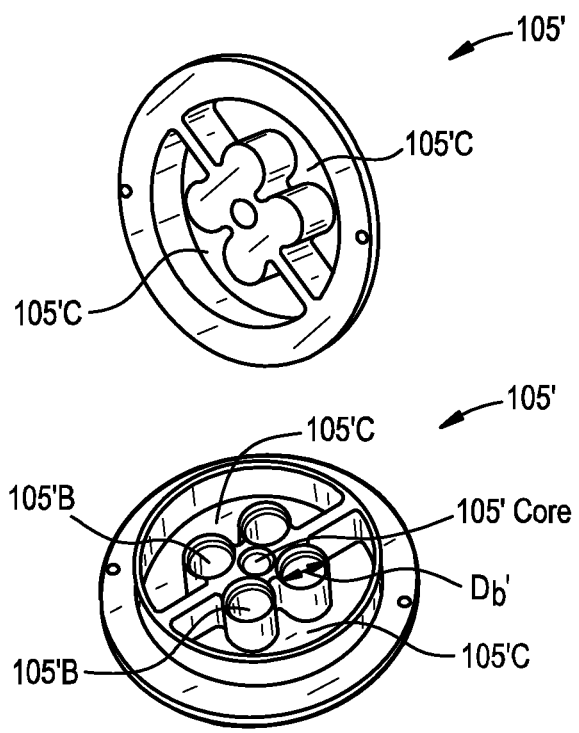
FIG. 3B illustrates an exemplary embodiments of the lower holding fixture.
Figure 3C:
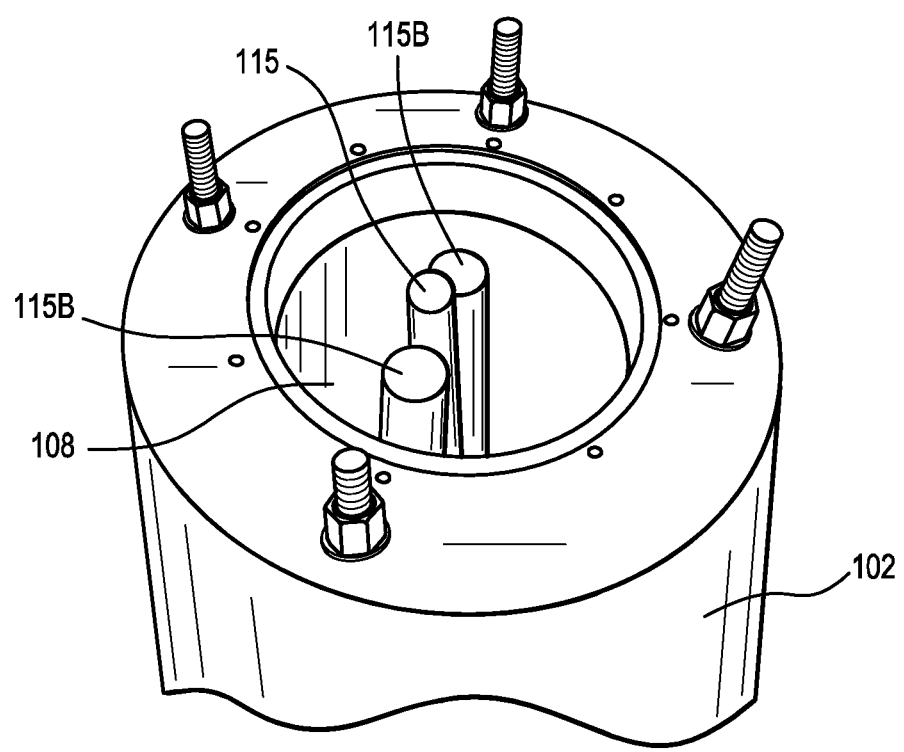
FIG. 3C illustrates an embodiment of the mold assembly that includes a mold cavity containing a core cane and two graphite mold rods.
Figure 3D:
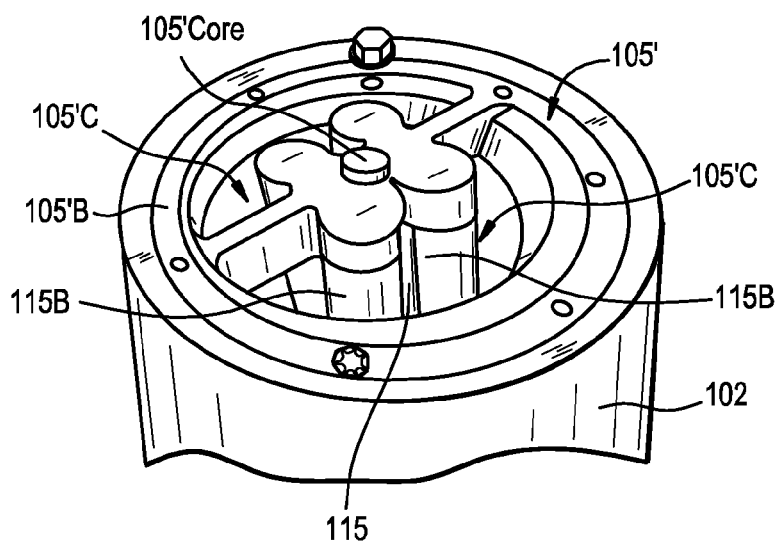
FIG. 3D illustrates the holding fixture for engaging and holding a core cane/rod and plurality of mold rods in the desired locations within the mold cavity of the mold assembly of FIG. 3C, while soot is poured into the mold cavity.

FIG. 3B illustrates an exemplary embodiment of the holding fixture 105'. The holding fixture 105' is utilized to hold the mold rods and the core cane in place, at the desired positions relative to one another, during the soot filling operation, and is removed before the upper mold rod/cane holder 106A is put in place. That is, after the soot filling operation is performed, and before the pressure is applied to the particulate glass material, the holding fixture 105' is removed and is replaced with the top end cap 106A. As shown in FIG. 3B, according to at least some embodiments, the holding fixture 105' comprises a plurality of holding cups 105'B for holding the top portions of the plurality of mold rods 115B in the specified positions during the soot filling operation. In this embodiment, holding fixture 105' also includes a central cup $105'_{core}$ for engaging and holding the top portion of the core cane 115 (or core rod) to hold the core cane in the center of the mold cavity during the soot filling operation. The holding fixture 105' also comprises aperture(s) 105'C, through which the soot may be poured into the cavity 108 while the holding caps 105'B and $105'_{core}$ engage and hold the mold rods and the core cane in place. In this embodiment the holding cups 105'B have an inner diameter $D'_b$ which generally corresponds to the diameter of a mold rod 115B. The central cup $105'_{core}$ has an inner diameter $D_b$ that generally corresponds to the diameter of the core cane or core rod held by the cup $105'_{core}$. FIG. 3C illustrates an embodiment of the mold assembly 100 that includes a mold cavity 108 containing a core cane 115 and at least two graphite mold rods 115B. FIG. 3D illustrates the mold the holding fixture 105' that engages and holds core cane 115 and a plurality of graphite mold rods 115B. As can be seen from FIG. 3D the holding fixture 105' comprises apertures 105'C through which the soot will be poured into the cavity 108.

The end caps 104A, 106A (i.e., the mold rod/cane holders) are removable and can be replaced by another set of mold rod/cane holders 104A, 106A, to prepare a fiber preform where the voids need to be of different size, and/or to be separated from one another by a different distance. The use of different end caps 104A, 106A allows the same mold assembly to 100 to be utilized for making fiber preforms of different geometries, to make different fibers.

Figure 4:
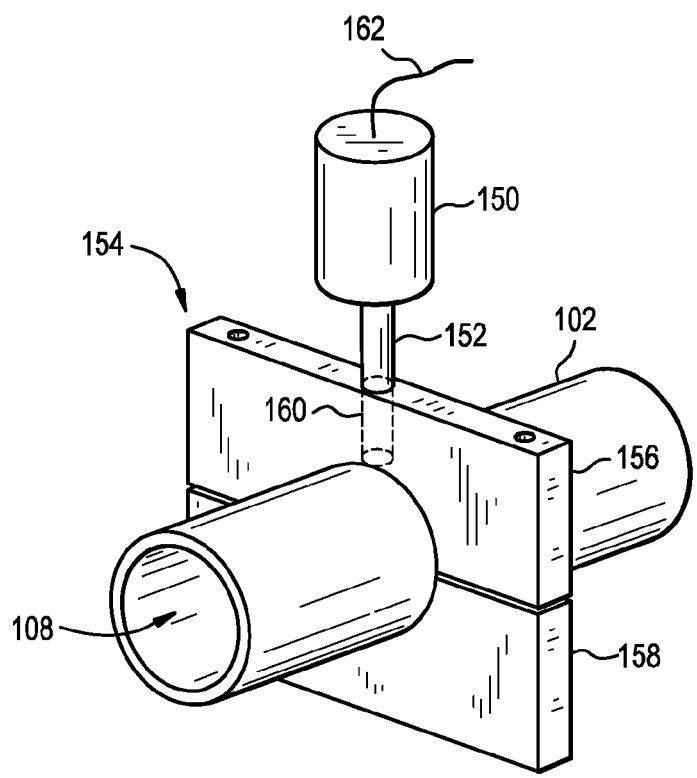
FIG. 4 depicts schematically a mold assembly coupled to an ultrasonic source according to one or more embodiments shown and described herein.

Referring now to FIG. 4, an exemplary mold body 102 of the mold assembly 100 is shown coupled to an ultrasonic source 150. The ultrasonic source 150 may be used to apply vibratory energy to the mold body 102 which is, in turn, propagated into the mold cavity 108. It is noted that the mold body 102 is shown schematically in FIG. 4, and that the ultrasonic source 150 can be coupled in a similar (or other) manner with different types of mold bodies 102 for pressing silica soot against the mold rods 115B—i.e., it can be used with devices suitable for the axial pressing, and with devices suitable for the radial pressing. The vibratory energy fluidizes silica glass soot loaded in the mold cavity 108 thereby reducing drag or friction between adjacent silica glass soot particles and friction between silica glass soot particles and the interior of the mold which, in turn, facilitates compressing silica glass soot to a greater and more uniform density along the length L of the mold than without the application of vibratory energy. The greater and more uniform density of soot compacts produced by applying vibratory energy during formation of the soot compact (situated around the mold rod(s)) produces an optical fiber preform assembly which, when consolidated into an optical fiber preform, has very little taper from the ends of the preform to the center of the preform. That is, the density of the glass formed from the soot compact is substantially uniform along the axial length of the optical fiber preform. It should be understood that the phrase "optical fiber preform assembly," as used herein, refers to a soot compact with a plurality of rods and/or holes which, when consolidated, forms an optical fiber preform that includes at least: (i) core rod(s) or core cane(s), (ii) stress rods or additional core canes situated in the holes left after the removal of mold rods, and/or holes left after the removal of mold rods; and (iii) a glass cladding portion corresponding to the soot compact. For example, the optical fiber preform assembly may include at least one glass core cane imbedded in a soot compact, which, when consolidated, forms the core portion of the preform.

It is noted that in some embodiments, instead of a core cane, a centrally located mold rod 115B can be inserted into the center of the cavity. After the compression is completed, prior to sintering, the mold rod is removed and a core cane 115 is inserted into the void 115W left by the mold rod.

In some embodiments, the ultrasonic source 150 is coupled to the mold body 102. In the embodiment shown, the mounting collar 154 comprises a first collar portion 156 and a corresponding second collar portion 158. The first collar portion 156 and the second collar portion 158 may be positioned around the mold body 102 and fastened together such that the mounting collar 154 is securely attached to the mold body 102. The first collar portion 156 may comprise a channel 160 extending through the first collar portion 156. The waveguide 152 may be positioned in the channel 160, such that the waveguide 152 is positioned proximate to the mold body 102 but not in direct contact with the mold body 102. The ultrasonic source 150 is coupled to the end of the waveguide 152 opposite the mold body 102 such that vibratory energy generated by the ultrasonic source 150 may be propagated along the waveguide 152, into the mounting collar 154 and, thereafter, to the mold body 102.

The ultrasonic source 150 may be coupled to a control unit (not shown) via electrical cable 162. The control unit may comprise a signal generator and a 5 kW power amplifier. The signal generator may be operable to produce various low voltage (e.g., 5-10 volts) electronic waveforms which are amplified by the power amplifier before the control unit passes the electronic waveforms to the ultrasonic source 150 via the electrical cable 162. A transducer in the ultrasonic source 150 converts the electronic waveforms to vibratory energy which is propagated along the waveguide 152 to the mold body 102 thereby mechanically vibrating the mold body 102 and the contents of the mold cavity 108. The electronic waveforms generated by the signal generator and passed to the ultrasonic source 150 may take on a variety of forms including, without limitation, sinusoidal waveforms, square wave waveforms, sawtooth waveforms, triangular waveforms and the like. In one embodiment, the ultrasonic source 150 may receive electronic waveforms from the control unit and, based on the received electronic waveforms, generate high frequency vibrations having a frequency from about 15 kHz to about 50 kHz (e.g., a range of frequencies spanning from acoustic or audible frequencies to ultrasonic frequencies) and, more preferably, from about 17 kHz to about 25 kHz. In another embodiment, the ultrasonic source 150 may be operated to generate high frequency/low amplitude vibrations in the audible or acoustic range from about 1 kHz to about 15 kHz (e.g., outside the ultrasonic range) and, more preferably, from about 1 kHz to about 5 kHz. The intensity or amplitude of the vibratory energy generated by the ultrasonic source 150 may be controlled by adjusting the amplitude or intensity (e.g., the power) of the electronic waveforms generated by the control unit.

Figure 5A:
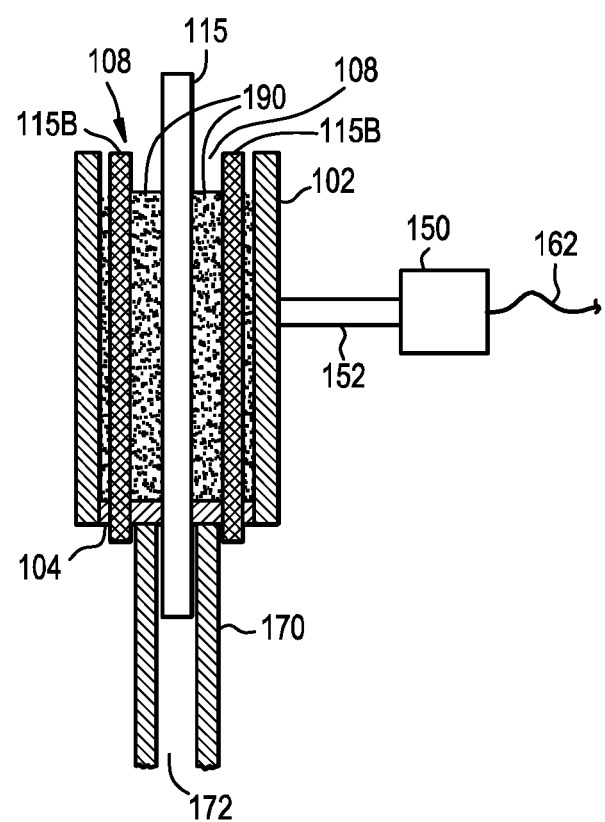
FIG. 5A depicts schematically a cross section of a mold assembly and ultrasonic source loaded with uncompressed silica glass soot according to one or more embodiments shown and described herein.
Figure 5B:
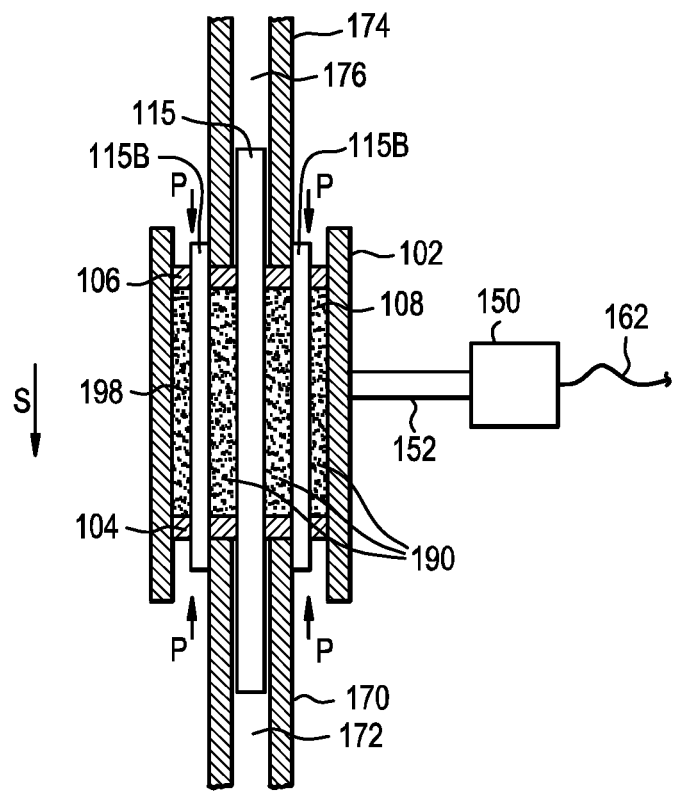
FIG. 5B depicts schematically a cross section of a mold assembly and ultrasonic source being used to form a soot compact around a glass core cane according to one or more embodiments shown and described herein.
Figure 6:
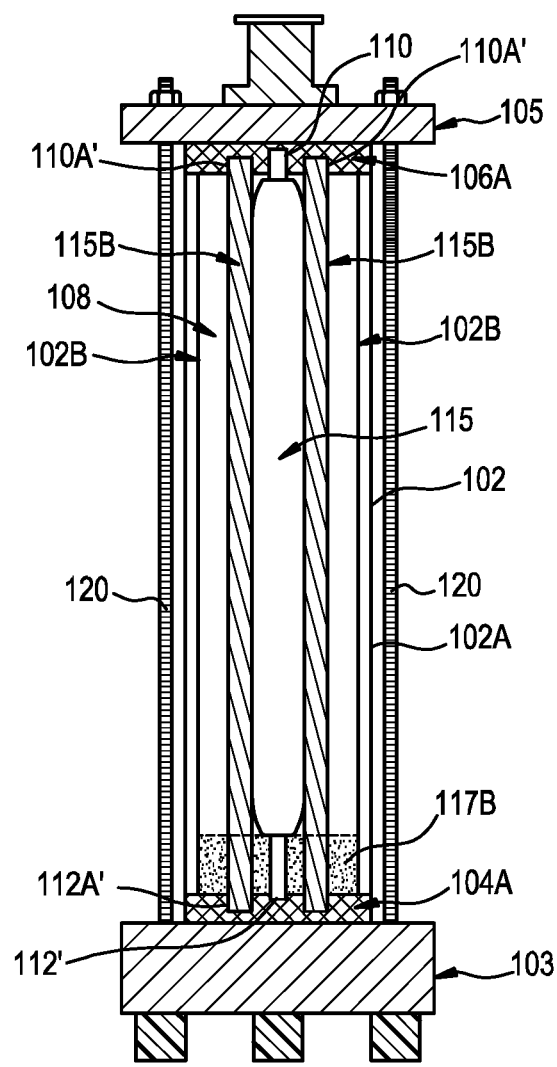
FIG. 6 depict schematically a cross section of a radial press mold assembly, including a core and 2 mold rods therein according to one or more embodiments shown and described herein.

Referring now to FIGS. 5A, 5B and 6, a cross section of a mold body 102 are shown schematically. In these embodiments, in order to form an optical fiber preform assembly, first, a glass core cane 115 (or alternatively a core mold rod 115$B_{core}$) and mold rod(s) 115B are positioned in the mold cavity 108, and then silica glass soot 190 is loaded around the core cane (or the mold rod which will be withdrawn later on to make a hole into a core rod will be inserted) and a plurality mold rods 115B, and compressed or pressed.

Depending on the embodiment, either the lower and upper end caps (mold rod/cane holders 104A, 106A) or the rams 104, 106 may be utilized. For example, the embodiment of FIG. 5A utilizes a lower ram 104 (shown) and an upper ram 106 (not shown) for axial pressing of the silica soot, while the embodiment shown on FIG. 6 does not. Instead, the exemplary embodiment of FIG. 6 utilizes the end caps 104A, 106A. The end caps 104A, 106A of this embodiment are different from the end caps illustrated in FIG. 3A. The end caps 104A, 106A of FIG. 6 do not have bores 112A, 110A, but instead have indentations or holding cups 110' (the center cup) and 110A' in the end cap 106A, and cups 112' (the center cup) and 112A' in the end cap 104A for holding the ends of core cane 115 and mold 115B situated therein. The mold assembly 100 is mounted between plates 103, 105, and the plates 103, 105 are then connected and are held in their proper positions via threaded rods 120. Alternatively (as described in more detail with reference to FIG. 13) the end caps 104A, 106A may have openings or holes for receiving rods 120, and be connected or bolted to one another so as to be held in their proper positions, via the bolts 120. Also, depending on the embodiment, the holding fixture 105' may or may not be utilized during the silica soot loading step, and the upper and lower end caps 104A, 106A may have ether bores or cups for holding the mold rods 115B and/or the core cane 115 (or core rod) in place. Although FIG. 6 illustrates the mold assembly 100 with the upper mold rod/cane holder in place, prior to loading soot into the mold cavity 108 a holding fixture 105' would be employed to secure the core cane 115 and the mold rods 115B in place, and afterwards the soot would be provided into the mold cavity 108 via aperture(s) 105'C of the holding fixture 105'. Thus the core cane 115 and the mold rods 115B are held in their proper positions, relative to one another, while soot 190 is being loaded into the mold cavity 108 through one or more apertures 105'C (soot entryway opening(s) in the holding fixture 105'). In this embodiment, after the soot loading step is completed, the holding fixture 105' is removed and replaced by the top end cap 106A that engages the core and/or mold rods in their proper positions during soot pressing. FIG. 6 also illustrates that the bottom portions of the mold rods 115B and of the core rod are resting inside a compressible foam plug 117$_B$ which is placed on top of the bottom end cap 104A. The foam plug 117$_B$ is placed inside the mold cavity 108 prior to its being filled by soot. The foam plug 117$_B$ is retained inside the mold cavity during soot pressing and cushions the mold rods, minimizing the possibility of bending or other damage. The foam plug 117$_B$ can be made, for example, from an open pore material such as silicone foam, can operate in a temperature range of 20-180° F. (pressure to compress 0.6 psi or higher). Such materials are available, for example, from Rogers Corporation of Livermore, Calif. Another exemplary material for plugs $117_B$ (or $117_T$) are Fostek semi-closed cell soft or super soft foams (available from Fostek Corporation of Bedford, Va.) may also be utilized.

The desired dimensions of the fully consolidated optical fiber preform govern the exact dimensions of the mold cavity, the sizes of the bores 110A, 112A (or the cups 110' (in the center), 110A', 112' (in the center), 112A' of the end caps 106A, 104A), and the final density of the soot compact created by the pressing operation. For typical exemplary laboratory scale optical fiber preforms, with a single core rod in the center, the exemplary desired core/clad ratio of the preform is 0.069 meaning that the core portion of the optical fiber preform is 6.9% of the preform diameter. Thus, if we have a glass core cane having a 19 mm diameter and the core diameter is 23% of the cane diameter or 4.18 mm, the outside diameter of the fiber preform after consolidation should be about 61 mm, in order to achieve the desired core/clad ratio of 0.069. The size of the mold needed to achieve an optical fiber preform of the desired dimensions may be thus determined by using the shrinkage rates for a given density of compacted silica glass soot. Shrinkage rates may need to be empirically determined for a given application, since the presence of non-compacting axial rods can cause anisotropic shrinkage of the soot. For example, an exemplary 89 mm diameter silica glass soot compact having a density of 0.81 g/cc, and surrounding a central 19 mm glass core cane rod has an axial shrinkage of about 21% and a radial shrinkage of about 32%, after consolidation to glass. Accordingly, to achieve a consolidated optical fiber preform having an outer diameter of 61 mm, the diameter of the mold cavity must be about 89 mm. Generally, to determine the necessary mold diameter to achieve a desired optical fiber preform geometry requires the following: the compacted soot density; experimentally derived values for axial; and radial shrinkage upon consolidation for a given soot density and the core/clad ratio of the glass core cane.

Thus, in order to form an optical fiber preform assembly comprising a glass core cane 115 surrounded by and coaxial with a soot compact cladding portion, a glass core cane 115, and one or more mold rods 115B may be positioned in the mold cavity 108. More specifically, according to some embodiments, the glass core cane 115 is positioned in the bore of the lower ram 104 (or in the bore of the bottom end cap 104A) such that the glass core cane 115 is substantially centered on the long axis of the mold body 102. The mold rod(s) 115B are positioned in the bores of the lower ram 104 (or in the bores 112A of the bottom end cap 104A) such that they are located off-center with respect to the long axis of the mold body 102. The glass core cane 115 may comprise a cylindrical silica glass-based core cane comprising at least a pure silica glass core or doped silica glass core. The glass core cane may also comprise additional glass layers surrounding the core, such as an inner cladding layer or the like, and such additional layers may include dopants such that the glass layers have an index of refraction different than that of the glass core.

Referring again to FIG. 5A, according to some exemplary embodiments, the glass core cane 115 and the mold rod(s) 115B may extend through the lower ram 104 and into a guide channel(s) of lower ram extension 170. In some embodiments (axial press embodiments), the lower ram extension 170 and upper ram extension 174 (shown in FIG. 5B and discussed further herein) transmit pressure from a press arm (not shown) of a press (not shown) to the rams 104, 106 thereby driving the rams 104, 106 towards one another along the axial direction of the mold body 102

After the glass core cane 115 (or a core mold rod situated) and/or mold rod(s) 115B are positioned in the mold cavity 108, the mold cavity 108 is loaded with particulate glass material, for example, silica glass soot 190. The silica glass soot 190 may comprise commercially available silica glass soot or silica glass particles. Alternatively, the silica glass soot may be soot recovered from pyrolysis of a chemical vapor depositions operation, e.g., from deposition of octamethyltetrasiloxane during outside vapor deposition (OVD) of an overclad portion of an optical fiber of other silica-based optical fiber preforms (e.g., silica glass soot recycled from an optical fiber preform manufacturing operation). The silica soot may comprise dopants, such as dopants which increase or decrease the index of refraction of silica glass, or the soot may be substantially pure silica glass soot. In one embodiment, the silica glass soot loaded into the mold cavity does not contain any binders. In one embodiment, silica glass soot may have a surface area between about 250 $m^2/g$ and about 5 $m^2/g$, more preferably from about 100 $m^2/g$ to about 10 $m^2/g$ and, most preferably, 50 $m^2/g$ to 10 $m^2/g$. These ranges generally correspond to particle sizes of about 10 nm to about 500 nm, more preferably 30 nm to about 250 nm and most preferably 60 nm to about 250 nm, respectively.

The amount of silica glass soot 190 loaded into the mold cavity 108 is dependent on the diameter of the mold cavity 108, the size of the core cane(s) 115 and the mold rods 115B, the desired length of the consolidated optical fiber preform, and the desired core/clad ratio for the consolidated optical fiber preform. Based on these considerations, the amount of silica glass soot 190 added to the cavity is selected such that the target soot density for a soot compact 198 used to form the cladding portion of an optical fiber preform may be from about 0.5 g/cc to about 1.2 g/cc, more preferably greater than 0.6 g/cc, and even more preferably greater than about 0.7 g/cc and less than about 1.1 g/cc, and most preferably greater than about 0.8 g/cc and less than about 1.0 g/cc.

In some embodiments, as shown in FIGS. 5A, 5B and 6, the silica glass soot 190 is loaded into the mold cavity 108 in a single step. In this alternative embodiment, as the silica glass soot 190 is loaded into the mold cavity 108, the silica glass soot may be stirred with slack in the glass core cane 115 to evenly distribute the soot in the mold cavity 108. Additionally or alternatively, the mold body 102 may be tapped and/or vibrated with an ultrasonic source as the silica glass soot is loaded into the mold cavity 108 to encourage uniform packing of the silica glass soot in the mold cavity 108. For example, vibratory energy may be applied to the mold cavity with the ultrasonic source 150 thereby fluidizing the silica glass soot and reducing friction between adjacent silica glass soot particles and reducing friction between silica glass soot particles and the interior surfaces of the mold cavity. When the silica glass soot is fluidized by the application of vibratory energy, the density of the silica glass soot loaded in the cavity may be increased without the application of mechanical pressure. Furthermore, the application of vibratory energy promotes uniformity in the density of the silica glass soot over the length of the mold body 102. In one embodiment, when vibratory energy is applied to the mold body 102 as the silica glass soot is loaded into the mold cavity, the silica glass soot may reach a density of at least about 0.35 g/cc and, more preferably, greater than about 0.37 g/cc without mechanically pressing the silica glass soot.

In another embodiment, silica glass soot may be loaded into the mold cavity 108 as a vacuum is drawn on the mold. For example, in one embodiment, a vacuum system (not shown) may be coupled to the mold cavity 108 proximate to the lower ram 104. This may be accomplished by positioning the mold body 102 in a vacuum base (not shown) operatively coupled to a vacuum system such that the mold cavity is fluidly coupled to the vacuum system. As silica glass soot is loaded in the mold cavity 108, the vacuum system is used to extract air from the mold cavity 108 and silica glass soot which, in turn, increases the density of the silica glass soot prior to compaction. In another embodiment, such as when the mold body 102 is constructed of a porous material, a vacuum may be drawn outside the mold body 102 thereby drawing air through the mold body 102 as soot is loaded into the mold cavity 108. In another embodiment (not shown), the silica glass soot is loaded into the mold cavity 108 in discrete portions and each portion of silica glass soot may be compressed before a subsequent portion of silica glass soot is added to the mold cavity 108 in order to improve uniformity in the density of the silica glass soot along the length of the mold body 102.

Axial Pressing

Referring again to FIGS. 5A and 5B, according to one embodiment, after the mold cavity 108 of the mold assembly 100 is loaded with the desired amount of particulate glass material such as silica glass soot, the particulate glass material (e.g., silica glass soot) is axially compressed to form a soot compact 198 around the glass core cane 115, and the mold rods 115B. To axially compress the silica glass soot, the upper ram 106 may be positioned in the mold cavity 108 such that the glass core cane 115 and the mold rods 115B are inserted through the bore of the upper ram 106, and the upper ram 106 is in direct contact with the loaded silica particulate glass material (e.g., glass soot 190). This is shown schematically, for example, in FIG. 5B. The mold assembly 100 may then be positioned in a press and the upper ram extension 174, which may be coupled to the press arm (not shown) of the press, is positioned against the upper ram 106 such that the glass core cane 115, and mold rods 115B is disposed in the respective bores and/or guide channel 176 of the upper ram extension 174 (and/or ram 106). In one embodiment, the lower ram extension 170 may be positioned on a support plate (not shown) of the press. In another embodiment the lower ram extension may contain a guide channel 172 and may be positioned on a second press arm (not shown).

In yet another embodiment, a vacuum system may be used to purge the mold of air during the pressing operation thereby eliminating air in the soot compact and reducing the overall compression time needed to obtain a soot compact of the desired density.

With the mold assembly positioned in the press, pressure P is applied to the upper ram 106 and the lower ram 104 with the press via the ram extensions 170, 174 such that the silica glass soot is compressed between the rams 104, 106. In one embodiment, the press is used to apply pressure to the upper ram 106 thereby advancing the upper ram 106 toward the lower ram 104. The upper ram 106 may be advanced at a rate of about 0.1 mm/sec to about 10 mm/sec and, more preferably 0.1 mm/sec to about 2.0 mm/sec. During the pressing operation, the mold body 102 is supported and allowed to slide in the axial direction (indicated by arrow S in FIG. 5B) at a rate of about ½ the rate at which the upper ram 106 is advanced so that both the top and the bottom rams move toward the middle of the mold. Allowing the mold body to slide maintains the symmetry of the compaction forces around the center of the soot compact 198 and, when vibratory energy is being applied, keeps the ultrasonic source positioned at the center portion of the soot compact 198 throughout the pressing operation.

In one embodiment, the axial position of each ram 104, 106 relative to the mold body 102 is monitored as the silica glass soot is compressed. Measuring the axial position of each ram 104 may be accomplished by placing a sensor (not shown), such as an ultrasonic sensor, a proximity sensor, an optical sensor, or the like, on a fixed point above and/or below the mold body 102 and using the sensor to measure the distance between the sensor and the ram as the ram is advanced along the axis of the mold body 102. In another embodiment, the axial position of the rams in the mold body 102 may be directly measured such as by Vernier calipers or similar measurement devices (not shown) operatively coupled to the rams and/or mold body 102. The use of sensors or measurement devices to detect the position of the rams in the mold cavity enables a real time calculation of the average density of the pressed silica glass soot based on the position of the rams in the mold cavity, the dimensions of the mold cavity, the dimensions of the rams, and the mass of silica glass soot placed in the mold cavity 108. The real time measurement of soot density may be used as a process control variable for the soot pressing process. More specifically, when the silica glass soot is compressed to a target density, as determined from the real time measurements, no additional mechanical pressure may be applied to the rams 104, 106.

In another embodiment, when the press is a hydraulically actuated press, the hydraulic line pressure of the hydraulic press is monitored and used to control the soot pressing process. The pressure in the hydraulic lines of the press is indicative of the resistance experienced by the hydraulic press arm as the silica glass soot is compressed. Accordingly, as the density of the soot increases through compression, the pressure in the hydraulic lines also increases. Thus, for given mold dimensions and mass of silica glass soot loaded into the mold cavity 108, the hydraulic line pressure may be indicative of the density of the soot during soot pressing process. Accordingly, the hydraulic line pressure may be used to determine when the compressed soot has reached a target density. (It is noted that the real time measurement of soot density and/or hydraulic line pressure may also be utilized to determine the density of the soot in the radial pressing embodiments.)

Figure 7:
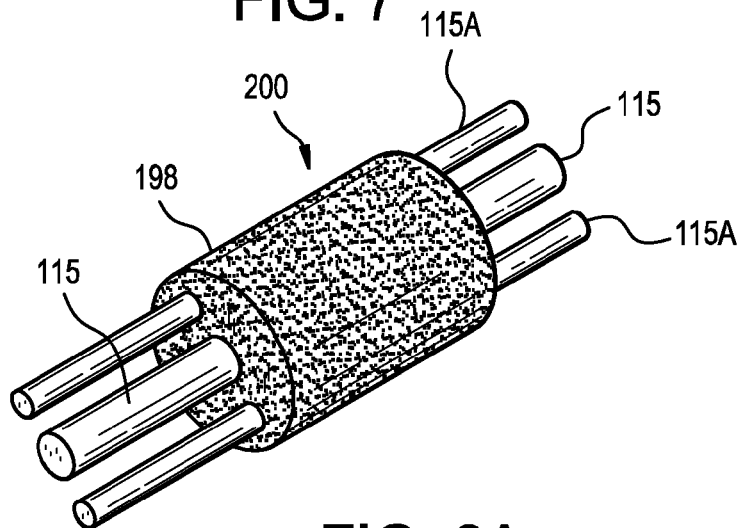
FIG. 7 depicts schematically an optical fiber preform assembly comprising a soot compact formed around a glass core cane according to one or more embodiments shown and described herein.
Figure 8A:
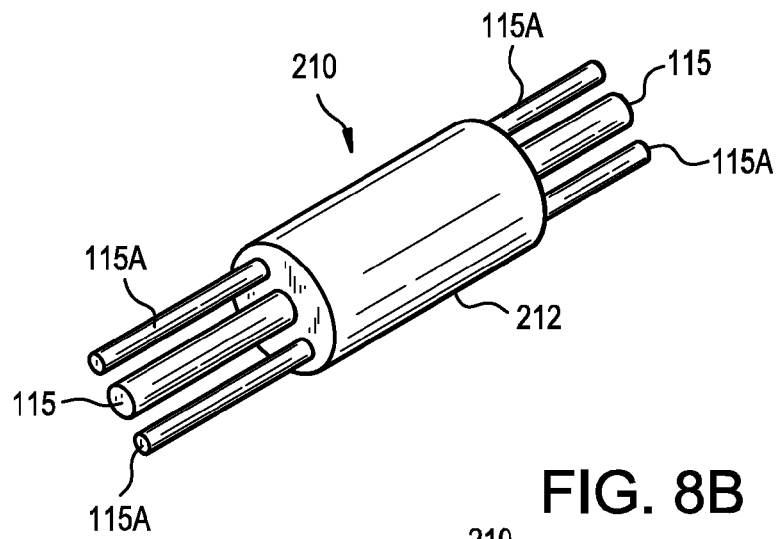
FIG. 8A depicts schematically an optical fiber preform produced according to one or more embodiments shown and described herein.
Figure 8B:
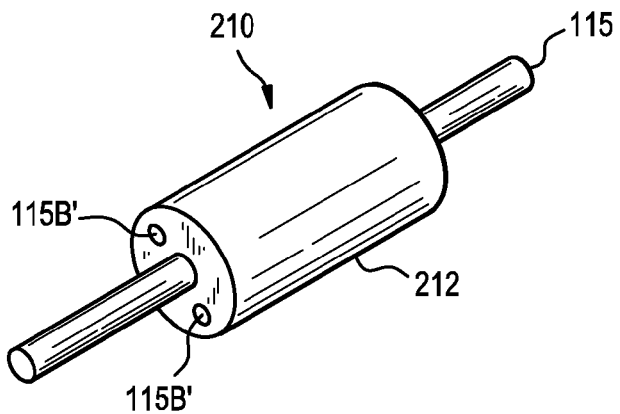
FIG. 8B depicts schematically another optical fiber preform produced according to one or more embodiments shown and described herein.
Figure 8C:
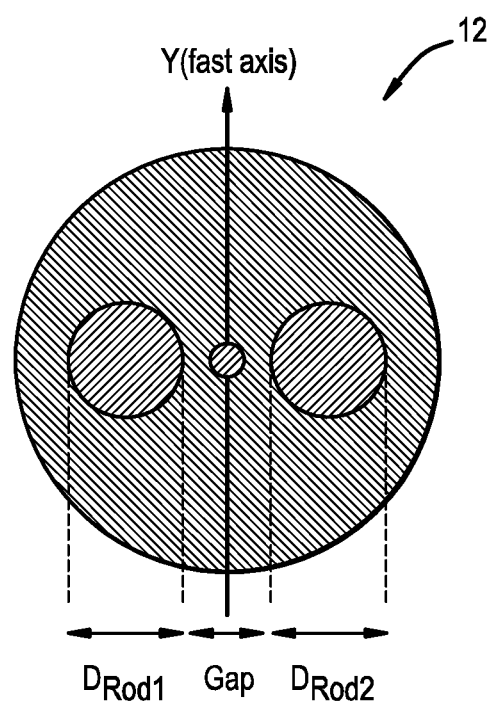
FIG. 8C depicts schematically an optical fiber produced from the optical fiber preform shown in FIG. 8A.

Following a relaxation period, pressure on the soot compact 198 is released and the upper ram 106 and the lower ram 104 are removed from the mold cavity 108 leaving the soot compact 198 with embedded glass core cane 115 and embedded mold rods 115B in the mold cavity 108. The mold rods 115B are removed and the glass stress rods 115A may then inserted into the voids 115W left by the mold rods 115B. As shown in FIG. 7, in this embodiment the soot compact 198 and embedded glass rods (core cane 115 and the inserted stress rods 115A) form an optical fiber preform assembly 200. The soot compact 198 forms the cladding portion of the optical fiber preform assembly 200. The optical preform assembly 200 is subsequently consolidated (fully sintered) to form the optical fiber preform 210. The glass core cane 115 forms the core portion of the optical fiber preform assembly 200. As shown in FIG. 8A, the glass stress rods 115A form the portion of the optical fiber preform assembly 200 that corresponds to the stress-inducing regions of the polarization maintaining or the single polarization fiber(s) 12 similar to that illustrated schematically in FIG. 8C. As shown in FIG. 8C the single polarization fiber 12 includes two stress rods having diameters $D_{Rod1}$ and $D_{Rod2}$, respectfully separated by a distance (Gap), and a centrally located core situated therebetween on the axis of symmetry (Y axis of the fiber).

In another embodiment, the mold rods 115B are removed from the soot compact 198, but neither stress rods nor additional core canes are inserted into voids 115W left by the removed mold rods 115B. In this embodiment, the soot compact 198 with the voids 115W and embedded central glass core cane 115 form another exemplary optical fiber preform assembly 200. The soot compact 198 with the voids 115W therein forms the cladding portion of the optical fiber preform assembly 200. The glass core cane 115 forms the core portion of the optical fiber preform assembly 200. The optical fiber preform assembly 200 is then sintered to form the (sintered) optical fiber preform 210, (see, for example FIG. 8B), which includes a sintered glass cladding 212 and a plurality of voids or holes 115W. Note that due to glass shrinkage during the sintering process the diameter of the voids 115W situated inside the sintered preform's glass cladding 212 may be of different diameter than the voids 115W situated in the unsintered soot compact 198. The optical fiber (e.g., SP or PM fiber) is drawn from the sintered preform sintered optical fiber preform 210, the resultant optical fiber comprising a core situated in the center of the fiber, a cladding, and a plurality of voids (e.g., 2 voids with a circular cross-section and parallel to the fiber axis and/or fiber core) situated within the cladding.

Alternatively in another embodiment (not shown), instead of stress rods 115A, additional cores 115 may be inserted into the voids 115W left by the mold rods 115B to form optical fiber preform assembly 200 in order to manufacture multi-core fibers therefrom.

In order to further process the optical fiber preform assembly into an optical fiber preform, the optical fiber preform assembly 200 must be removed from the mold cavity 108. In one embodiment, to remove the optical fiber preform assembly from the mold cavity 108, the mold assembly is removed from the press and positioned on an extension rod such that the long axis of the mold body 102 is substantially vertical. Vibratory energy is then applied to the mold body 102 and the mold body is pressed off from the soot compact 198 leaving the optical fiber preform assembly positioned on the extension rod. As discussed above, according to some exemplary embodiments, if the mold rods 115B are removed prior to the removal of the mold body off from the soot compact 198 (or prior to the removal of the compact from the mold cavity), the optical preform assembly 200 will include holes (voids 115W).

In yet another embodiment, the optical fiber preform assembly 200 may be removed from the mold cavity 108 by pre-sintering the soot compact 198 of the optical fiber preform assembly. Pre-sintering reduces the size of the soot compact such that the soot compact 198 may be easily removed from the mold cavity 108. Pre-sintering also increases the mechanical durability of the soot compact prior to consolidation and improves adhesion between the partially sintered soot compact and stress rods. If mold rods 115B are utilized to create holes in the optical fiber preform assembly 200, the mold rods 115B should preferably be removed from the soot compact before the pre-sintering step develops adhesion of the pre-sintered soot to the mold rod(s), and/or before the mold rod(s) is damaged by the thermal environment. The steps of pre-sintering or re-sintering the soot compact 198 may also include the step of drying the soot compact. For example, to dry the soot compact 198, the mold with the soot compact may be loaded into a silica muffle in the hot zone of a tube furnace. The muffle is capped at both ends and a vacuum is pulled as the temperature of the furnace is increased to 300° C. The preform is held for 17 hours at 300° C. under a vacuum. To pre-sinter the soot compact, the muffle is then back filled with helium to 1 atmosphere, evacuated and refilled with helium to 1 atmosphere an additional time. The temperature of the tube furnace is then ramped to 900° C. and held for four hours under flowing helium. The tube furnace is then cooled. When the tube furnace reaches room temperature the helium flow is stopped and the mold is removed from the capped muffle. The pre-sintered soot compact may be removed from the mold as the diameter of the soot compact has decreased during pre-sintering.

Example 1—Axial Pressing

In this exemplary embodiment, an optical fiber preform assembly is prepared by inserting a core rod 115 and two graphite mold rods 115B into the mold cavity of the and by loading the mold cavity with silica glass soot in a single step. To form the optical fiber preform assembly, a glass core cane 1.9 cm in diameter and two graphite mold rods of 24 mm in diameter (similar to those shown in FIG. 1A) are positioned in a carbon mold having a mold cavity 89 mm in diameter and a length of 610 mm. (The graphite rods can be fabricated according to custom specifications. They are cut to required sizes, shapes, diameters and length. A finer grain graphite is preferred for fabricating graphite the mold rods 115B, resulting in a smooth surface or finish.) The graphite mold rods 115B are, for example Ultrapure with a precision ground surface. The exemplary graphite mold rods utilized in mold rods 115B of this embodiment are graphite rods having a specific gravity of 1.83, specific resistance of 12.5 μΩm, flexural strength of 64.1 MPa, shore hardness of 62, average graphite grain size of 7.1 μm, and density of about 1.82 g/cm$^3$. Such graphite rods are available, for example, from MWI of Rochester, N.Y. (also see graphitestore.com). In this embodiment the mold cavity 108 is lined with a vitreous carbon coating. The length of the glass core cane in this example is the same as the length of the mold.

In this (axial press) embodiment, the glass core cane 115 is positioned in the mold cavity by inserting an end of the glass core cane into the bore of a ram positioned in the lower portion of the mold cavity. The mold rods 115B are also positioned in the mold cavity by inserting an end of each mold rod into the (off-axis) bore of a ram positioned in the lower portion of the mold cavity. The top portions of the core rod and the mold rods may be optionally capped by holding fixture 105' such that the upper portion of the mold rods 115B and the upper portion of the core cane are engaged by holding cups 105'B of the holding fixture 105'. Thus the core cane 115 and the mold rods 115B are held in their proper positions, relative to one another, while soot 190 is being loaded into the mold cavity 108, for example through the apertures 105'C of the holding fixture 105'. About 930 g of silica glass soot is added to the mold cavity such that the glass core cane is centered in the silica glass soot and the old rods are position off center, relatively close to the core rod. In order to achieve a particular optical fiber design, the exact position of the mold rods 115B relative to that of the core cane in the starting configuration of the mold can be determined by calculating back from the desired fiber design, and utilizing measured shrinkage rates of the soot during consolidation. (That is, by starting with the desired configuration, and determining the starting configuration by factoring in the known shrinkage rates.). It may be necessary to measure the axial and radial soot-to-glass shrinkage because the presence of axial rods in the soot compact can constrain the axial shrinkage relative to the radial shrinkage. If the rods are aligned along a single fiber diameter, there may also be a difference in the shrinkage rates along the two orthogonal radial fiber dimensions. The adjustable parameters that are needed to complete the calculation are the soot tap density, the soot final compacted density, and the mold diameter. Vibratory energy is applied to the mold body after the silica glass soot is loaded into the mold cavity in order to maximize the pre-compression density of the silica glass soot. In this embodiment, after the soot loading step is completed, the holding fixture 105' is removed and replaced by the top (upper) ram 106 that engages the core and/or mold rods in their proper positions during the soot pressing step (See, for example, FIG. 5B). In this embodiment, ram extensions are inserted into the mold cavity around the glass core cane and stress rods, and the mold and extensions are positioned in a hydraulic press. The press arm of the hydraulic press is fitted to the upper ram extension while the lower ram extension is positioned on a support plate of the hydraulic press. Vibratory energy is applied to the mold at a frequency of about 17 to 19 kHz at 51% of the power of the 5 kW amplifier. The exact preferred resonant frequency depends on details of the ultrasonic transducer, the waveguide, the clamp, and the mold, and must be optimized independently for each specific set of elements. A multimode frequency sweep of 40 Hz with a 0.026 s period is applied to the vibratory energy to avoid establishing standing waves in the mold cavity.

To compress the soot, the top ram of the press is advanced toward the bottom ram, for example at a rate of 4.8 mm/sec. The mold is allowed to slide relative to the soot compact at a rate of about 2.4 mm/sec thereby keeping the ultrasonic source centered on the suit compact. The density of the suit can be calculated in real time throughout the pressing operation based on the measured position of the top ram in the mold cavity, the dimensions of the mold, and the mass of the soot. When the calculated density of the soot is within 0.01 g/cc of the target density (0.8 g/cc in this example), the vibratory energy is discontinued. When the calculated density of the soot reaches the target density of 0.8 g/cc, the motion of the press arm of the hydraulic press is discontinued such that only a static load of 209 lbs. remains in the hydraulic line of the press. In this embodiment, after a period of about 10 minutes, the static load is released and the graphite mold rods 115B are removed from the optical fiber preform assemblies. Thereafter, the optical fiber preform assemblies are positioned in a tube furnace and dried in a flow of helium with 5% chlorine for 1 hour at 1000° C. The optical fiber preform assemblies are then pre-sintered at 1200° C. for 1 hour and then consolidated, as described hereinabove. (Any remaining graphite material left on Silica soo104At after the removal of graphite mold rods is the burned away). The diameter variation of the samples is expected to be less than about ±10% of the minimum diameter of the consolidated optical fiber preform. The pre-sintered optical fiber preform assemblies are subsequently sintered, via methods known to those of skill in the art, to yield the sintered optical preform 210. As discussed above, prior to the sintering step (either before or after pre-sintering) either glass stress rods (for example silica based boron doped glass rods) or additional core canes may be inserted into the holes left by the mold rods, to make an optical preform that is suitable for making single polarization fibers (because of the stress rods contained therein), or a multicore fiber. Alternatively, also as discussed above, the sintering step may be conducted with the holes left in the soot, resulting in the optical preform with a plurality of elongated holes therein.

Radial Pressing

The following examples illustrate a method and an apparatus that utilize radial pressure, directed inward toward the center of the mold cavity, to compact particulate glass material for making the cladding portion of the optical preform.

Figure 9:
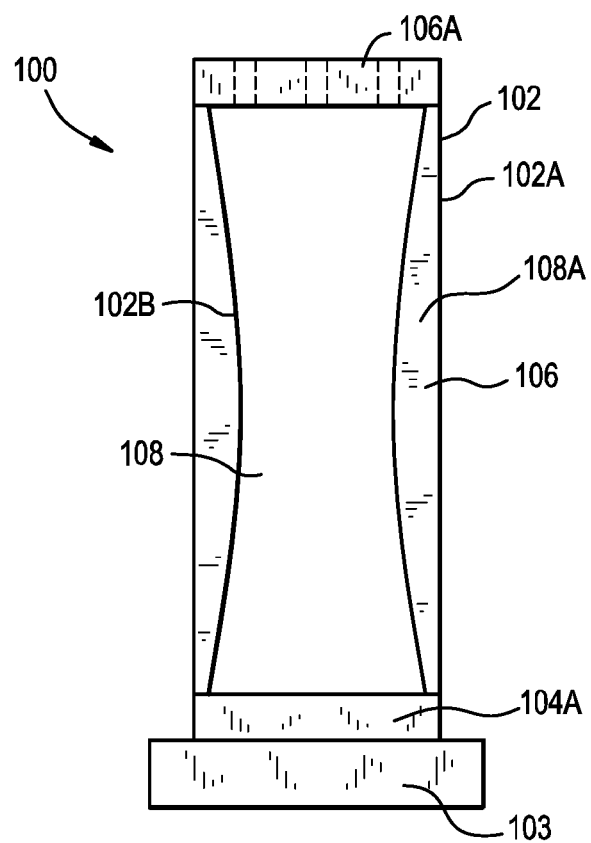
FIG. 9 illustrates schematically a partial cross-sectional side view of an apparatus that can be used in accordance with a preferred method of the present invention wherein the pressure on either side of a flexible inner wall of the apparatus is approximately equal.

Reference will now be made to FIGS. 9-14, which illustrate another exemplary embodiment of a method and apparatus in accordance with the present invention. FIG. 9 shows a partial cross-sectional side view of an apparatus (mold assembly 100) that can be used in accordance with some embodiments of the present invention. Mold assembly 100 of this embodiment includes a body 102 with a rigid outer wall 102A and a flexible inner wall 102B, wherein the flexible inner wall 102B surrounds an inner cavity 108 (i.e., the mold cavity) of the apparatus and the area between the rigid outer wall 102A and flexible inner wall 102B defines an annular cavity 108A. By "rigid" we mean rigid as compared to the flexible inner wall 102B and by "flexible" we mean flexible as compared to the rigid outer wall 102A. The rigid outer wall 102A of the mold assembly 100 may have a circular cross section to form a cylindrical mold, or alternatively may be elliptical, hexagonal, or even irregular in order to achieve a specific optical fiber design. In the embodiment shown in FIG. 9, the pressure on either side of the flexible inner wall 102B is approximately equal. That is, the pressure in the annular cavity 108A is approximately equal to the pressure in the mold cavity (inner cavity) 108. Apparatus 100 of this embodiment further includes a bottom (or lower) end cap 104A and a top (or upper) end cap 106A. The bottom end cap 104A and top end cap 106A of at least one exemplary embodiment (see, for example, FIG. 11) each preferably include: (i) a centerline hole, such as the bore 112, 110 (not shown), for receiving and centering a glass rod (the glass core cane); and (ii) at least one other, non-centrally located hole (e.g., bore 110A, 112A) for receiving mold rod(s) 115B. The non-centrally located holes 110A, 112A in the top and bottom end caps 106A, 104A may be in the form of elongated slots (e.g., an ellipse) that have their long dimension oriented along a radius, so as to allow movement of the glass rod or mold rod toward the core rod (see, for example, FIG. 11) during the radial compaction (radial pressurization). For example, an elliptical slot may have an outer radius (shorter dimension) that corresponds with the outer diameter or dimension of the non-centric rods in a designed starting arrangement (e.g., the diameter of mold rods 115B), and then extends toward the center of the end cap a sufficient length to prevent the rod from bending.

In an alternative embodiment (see FIG. 6) the top and the bottom end caps 106A, 104A have indentations or cups 110', 110A', 112', 112A' for receiving the mold rods 115B and the core rod 115 and for holding them in the proper locations within the mold cavity 108. In the embodiment of FIG. 6 the mold rods 115B do not move toward the core rod 115 when inwardly directed radial pressure is applied to the soot during soot compaction. In the FIG. 6 embodiment the soot compacts around the stationary mold rods 115B.

Top end cap 106A and bottom end cap 104A each preferably provide a pressure seal at the top and bottom of annular cavity 108A and also each preferably allow excess air in the inner cavity 108 to escape via the centerline hole and/or via the other hole(s). Preferred materials, for end caps include metals, such as aluminum, or plastics.

Cylindrical rigid outer wall 102A of the embodiments of FIGS. 6, 9-14 can be made of any material that has the mechanical strength to withstand, without appreciable deformation, the maximum normal operating pressures in the annular cavity 108A. In one preferred embodiment, cylindrical rigid outer wall 102A is made of aluminum. Other preferred materials for cylindrical rigid outer wall 102A include, for example, other metals or plastics. In a preferred embodiment, cylindrical rigid outer wall 102A has a substantially uniform diameter along its axial length. In alternative embodiments, cylindrical rigid outer wall 102A has a diameter that varies slightly along its axial length to counter pressure differences that may exist at the top and bottom of the mold assembly (apparatus 100). Cylindrical rigid outer wall 102A may comprise a uniform cylindrical piece or it may comprise two or more cylindrical segments attached end to end.

Flexible inner wall 102B can be made of any material that has sufficient elasticity and yield strength to sufficiently elastically deform radially inwardly without suffering plastic deformation when subjected to the maximum normal operating pressures in the annular cavity 108A. In a preferred embodiment, flexible inner wall 102B is a tube made of a latex material, such as standard elastomeric latex tubing available from Piercan USA, Inc. Other preferred materials for flexible inner wall 102B include, for example, Neoprene, Buna-N, polyurethane, or silicone rubber. Preferably, flexible inner wall 102B has a tensile strength of 95 to 7,000 psi and an elongation of 200% to 800%. In a preferred embodiment, flexible inner wall 102B is sealed to cylindrical rigid outer wall 102A. The seal may be accomplished, for example, by compressing a flap (not shown) onto the outside surface of the cylindrical rigid outer wall 102A or by fixing with an adhesive. In such an embodiment, a pressurization access point and valve (not shown) can be provided in order to pressurize and depressurize the annular cavity 108A. In an alternative embodiment, flexible inner wall 102B can comprise a toroidal bladder fitted into the cylindrical rigid outer wall 102A. In such an embodiment, a seal between the toroidal bladder and the cylindrical rigid outer wall 102A is not necessary.

Figure 10:
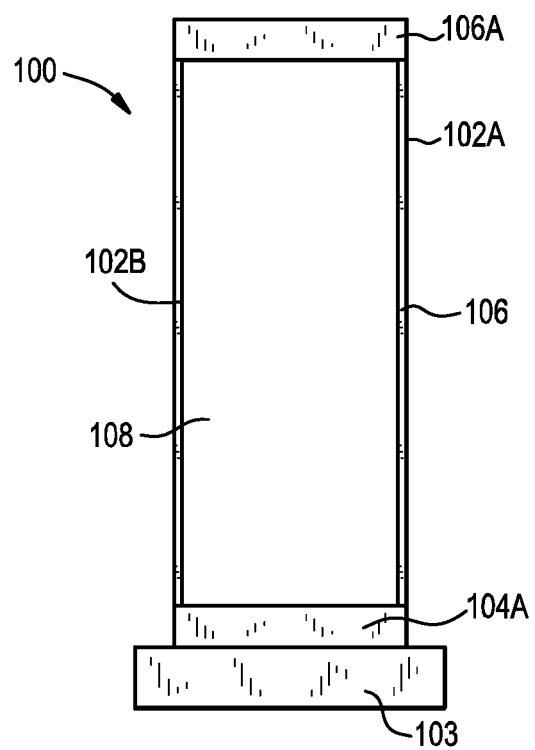
FIG. 10 illustrates schematically a partial cross-sectional side view of an apparatus that can be used in accordance with a preferred method of the present invention wherein the air between a flexible inner wall and a rigid outer wall of the apparatus has been mostly removed.

As shown in FIG. 10, annular cavity 108A can be depressurized such that air is mostly or nearly completely removed from annular cavity 108A. As a result of such depressurization, flexible inner wall 102B elastically deforms radially outwardly such that, as shown in FIG. 10, the maximum outer diameter of flexible inner wall 102B is nearly equal to the inner diameter of rigid outer wall 102A. Meanwhile, the volume of annular cavity 108A is decreased while the volume of inner cavity 108 is increased.

Figure 11:
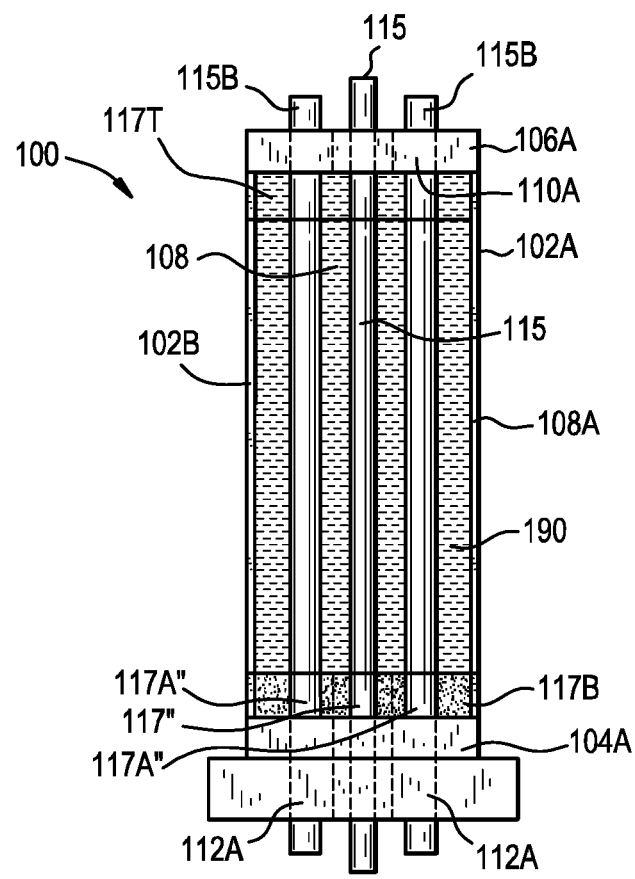
FIG. 11 illustrates schematically a partial cross-sectional side view of an apparatus that can be used in accordance with a preferred method of the present invention wherein a glass rod is centered within an inner cavity of the apparatus.

As shown in FIG. 11, a consolidated glass rod (glass core cane 115) may be placed and centered in inner cavity 108 of apparatus 100. One or more or more mold rods 115B are also placed (off-center) in the inner cavity 108. As shown in FIG. 11, annular cavity 108A is depressurized as in FIGS. 10 and 11. Glass rod 115 (glass core cane) can extend through inner cavity 108 as well as through centerline hole (not shown) in bottom end cap 104A such that top and bottom portions of glass rod 115 extend out of the apparatus 100. Similarly mold rods 115B can extend through inner cavity 108 in bottom end cap 104A, such that top and bottom portions of mold rods 115B extend out of the apparatus 100. An optional (bottom) plug 117$_B$ made of, for example, foam rubber may be placed at the bottom of mold cavity (in this example, the inner cavity 108). Plug 117$_B$ has a centerline hole 117" and off-center hole(s) 117A" or receiving glass rod 115, and/or 115B. Plug 117$_B$ preferably has a diameter that is about the same as the inner diameter of rigid outer wall 102A and centerline hole 117" of plug 117$_B$ preferably has a diameter that is about the same or slightly smaller than the diameter of glass rod 115 such that plug 117$_B$ fits snugly at the bottom of inner cavity 108 and around glass rod 115. Similarly the off-center hole(s) 117A" of plug 117$_B$ preferably have a diameter that is about the same or slightly smaller (in at least one cross-section) than the diameter of mold rods 115B such that plug 117$_B$ fits snugly at the bottom of inner cavity 108 and around the mold rods 115B. Plug 117$_B$ can serve to prevent loose soot from escaping through the bottom of the apparatus and can further serve to impart rounded or tapered ends to the pressed soot body. For example, the embodiment shown in FIG. 11 includes end caps with the optionally elongated holes 110A, 112A to provide for the movement of mold rods toward the core rod 115, during radial compression.

Figure 12:
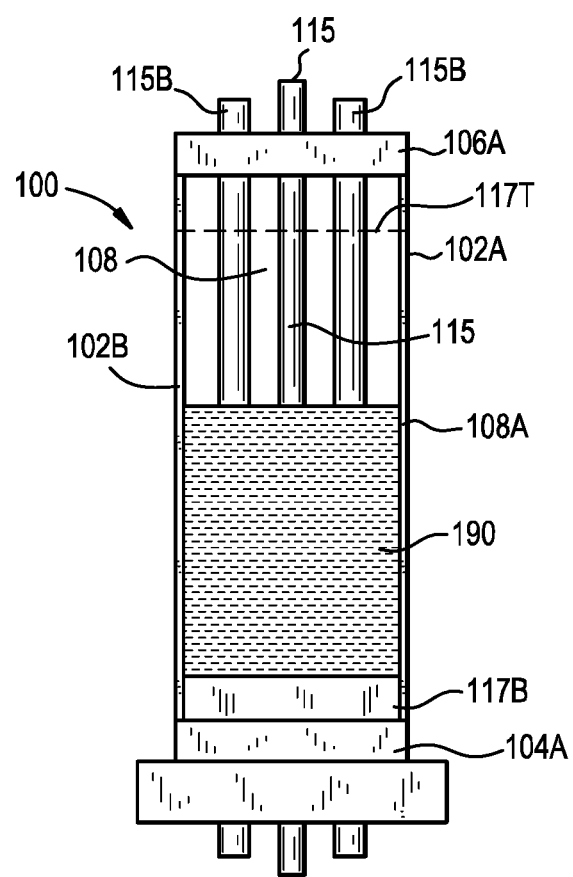
FIG. 12 illustrates schematically a partial cross-sectional side view of an apparatus that can be used in accordance with a preferred method of the present invention wherein glass soot is deposited in the inner cavity between the glass rod and the flexible inner wall.
Figure 13:
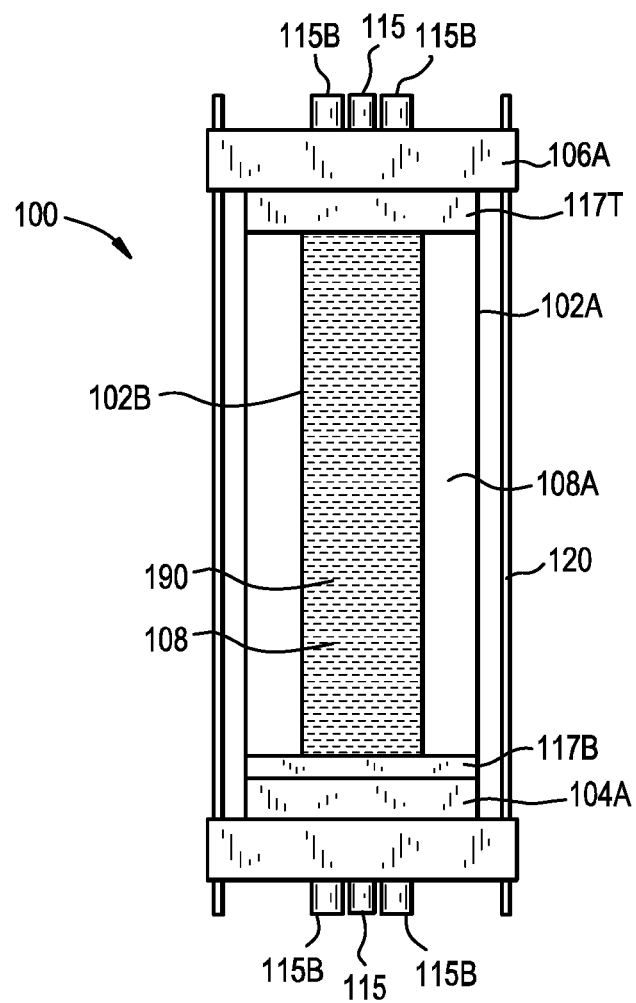
FIG. 13 illustrates schematically a partial cross-sectional side view of an apparatus that can be used in accordance with a preferred method of the present invention wherein the glass soot is pressed by providing a pressurized fluid between the rigid outer wall and the flexible inner wall.

As shown in FIG. 12, particulate glass material (such as glass soot 190) can be deposited or poured through into the inner cavity 108 between glass rod 115, mold rods 115B and the flexible inner wall 102B, and the soot is then pressed as shown FIG. 13. As shown in FIG. 12, while the silica soot is deposited into the mold cavity 108, the annular cavity 108A is depressurized as shown in FIG. 11. While FIG. 12 shows inner cavity 108 approximately half filled with glass soot 190, in preferred embodiments, glass soot is deposited or poured into inner cavity 108 until inner cavity 108 is nearly full. Following the depositing or pouring of glass soot 190 into inner cavity 108, an additional plug 117$_T$ (top plug, not shown) may be placed above glass soot 190 and around rod(s) 115, and/or 115B near the top of inner cavity 108, i.e., under the top end cap 106A. Preferably, inner cavity 108 is depressurized following deposition of glass soot 118 into the inner cavity. The plug 117$_T$ is compressible and is made, for example from foam rubber. The plug 117$_T$ helps protect the mold rods 116B and can further serve to impart rounded or tapered ends to the pressed soot body.

As shown in FIG. 13, the glass soot 190 deposited in inner cavity 108 is pressurized by providing a pressurized fluid in annular cavity 108A between rigid outer wall 102A and flexible inner wall 102B. In preferred embodiments, top end cap 106A is placed into position and connected to bottom end cap 104A using threaded rods 120. Next, fluid can be gradually introduced into annular cavity 108A such that the pressure in annular cavity gradually increases from negative to positive pressure as compared to atmospheric pressure. Preferably, the pressure in annular cavity 108A is increased at a rate of less than 50 psi/min, and even more preferably at a rate of less than 20 psi/min, such as from 2 to 20 psi/min and further such as from 5 to 15 psi/min. As the pressure of the pressurized fluid in annular cavity 108A gradually increases to increasingly higher positive gauge pressures, flexible inner wall 102B elastically deforms radially inwardly against glass soot 190 (causing the volume of annular cavity 108A to gradually increase and the volume of inner cavity 108 to gradually decrease) and glass soot 190 is pressed radially inwardly toward rod 115 and around mold rods 115B. Preferably, the pressure of the pressurized fluid in annular cavity 108A is increased until it reaches a maximum predetermined value. The pressure may or may not be held at this value for a predetermined amount of time. When held for a predetermined amount of time, the pressure may, for example, be held for at least 1 minute, such as from 1 minute to 10 minutes, including about 5 minutes.

In preferred embodiments, during the step of pressuring the glass soot, the pressurized fluid has a maximum pressure of from 25 psig to 250 psig, such as from 50 to 200 psig, and further such as from 75 to 150 psig. Examples of pressurized fluid include air, inert gases (e.g., nitrogen), water, and oil. A particularly preferred pressurized fluid is air. In preferred embodiments, during the step of pressurizing the glass soot, the temperature of the inner cavity 108 is less than 50° C., such as from 20° C. to 40° C., and even more preferably, room temperature (i.e., between 20 C and 25 C).

Figure 14:
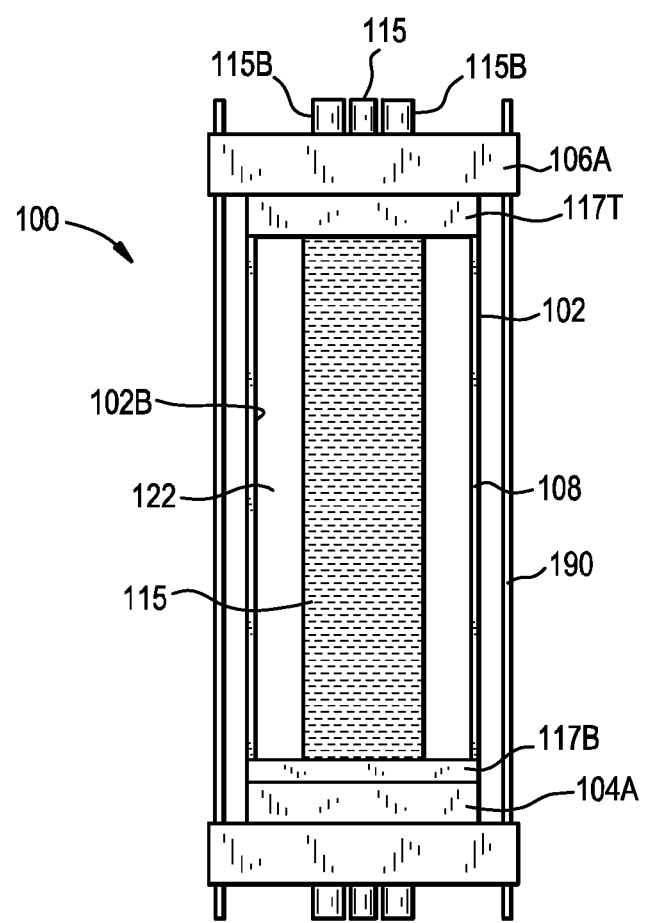
FIG. 14 illustrates schematically a partial cross-sectional side view of an apparatus that can be used in accordance with a preferred method of the present invention wherein pressurized fluid is mostly removed from between the rigid outer wall and the flexible inner wall.

After the soot has been pressed sufficiently, as shown in FIG. 14 the pressurized fluid in annular cavity 108A may be released such that annular cavity 108A is depressurized as shown in FIG. 10 (such that the pressure in annular cavity 108A is less than the pressure in inner cavity 108). Preferably, the pressure in annular cavity 108A is decreased at a rate of less than 50 psi/min, and even more preferably at a rate of less than 20 psi/min, such as from 2 to 20 psi/min and further such as from 5 to 15 psi/min. As the pressure in annular cavity 108A gradually decreases, flexible inner wall 102B deforms radially outwardly away from pressed glass soot 190 (causing the volume of annular cavity 108A to gradually decrease and the volume of inner cavity 108 to gradually increase) such that an annular gap 122 is present in inner cavity 108 between the outer diameter of pressed glass soot 190 and flexible inner wall 102B.

Following depressurization of annular cavity 108A, the mold rods 115B are removed, and optionally the stress rods 115A are inserted into the voids left by the removal of mold rods 115B. The resultant pressed soot/cane assembly or porous preform 200, is ready to be removed from the apparatus for cleaning, and subsequent consolidation.

In some embodiments, the glass rod 115 is a core cane. In alternative preferred embodiments, the glass rod 115 is a core cane surrounded by a porous soot clad layer.

In some embodiments, porous preforms can be provided in which the particulate glass material pressed against the glass rod has a density of at least 0.5 grams per cubic centimeter, for example 0.6 to 1.2 grams per cubic centimeter, or 0.8 to 1.0 grams per cubic centimeter, e.g., about 0.9 grams per cubic centimeter. The density of the particulate glass material pressed against the glass rod is largely a function of the maximum pressure applied during the step of pressurizing the particulate glass material. Generally, the greater maximum pressure applied during the step of pressurizing the particulate glass material, the greater the density of that material and, hence, the greater the overall density of the porous preform. Using methods disclosed herein, for example, porous preforms having a density of at least 0.6 grams per cubic centimeter can be produced using maximum pressures of at least 50 psig; porous preforms having a density of at least 0.7 grams per cubic centimeter can be produced using maximum pressures of at least 100 psig; porous preforms having a density of at least 0.8 grams per cubic centimeter can be produced using maximum pressures of at least 150 psig, and porous preforms having a density of at least 0.9 grams per cubic centimeter can be produced using maximum pressures of at least 200 psig.

In preferred embodiments, the porous preform has a substantially uniform diameter in the axial direction. Preferably, the smallest diameter of the preform along its axial length is at least 90% of its largest diameter along its axial length. Even more preferably, the smallest diameter of the preform along its axial length is at least 95% of its largest diameter along its axial length.

Porous preforms made in accordance with embodiments disclosed herein are capable of being consolidated into a glass blank (i.e., consolidated glass preform) using standard consolidation equipment and processes and then drawn into optical fiber using standard drawing equipment and processes. Preferably, the pressed soot surrounding the cane of the porous preform will eventually form overcladding once the porous preform is consolidated and drawn into an optical fiber, such that at least 35%, and further such as at least 40%, and even further such as at least 50% of the total mass of the overcladding is derived from the pressed soot. When consolidated into a glass blank, porous preforms made in accordance with some of the embodiments disclosed herein can result in a consolidated blank such that the smallest ratio of the outer diameter of the core to the outer diameter of the cladding (i.e., the smallest core/clad ratio) is at least 98% of the largest ratio of the outer diameter of the core to the outer diameter of the cladding (i.e., the largest core/clad ratio) along the axial length of the blank.

The adhesion of the soot to the core cane(s) can be improved by creating a static charge on the core cane and/or these rods (e.g., by rubbing with a piece of silk) prior to filling the apparatus with soot. As described above, the adhesion of soot to mold rods 115B made of graphite or metal coated with 0.1-100 μm (for example, 0.1-2 μm) thick coating of graphite, amorphous silicon (a-silicon), and/or amorphous carbon (a-c) is minimal, thus enabling easy and smooth removal of the mold rods 115B from the soot compact, minimizing stress on the surrounding soot during mold rods removal, and preserving the desired smoothness of surface of the soot compact surrounding and contacting the mold rods during their removal.

Example 2—Radial Pressing

Example 2 embodiment illustrates the method and an apparatus that utilize radial pressure, directed inward toward the center of the mold cavity, to compact particulate glass material for making the cladding portion of the optical preform. More specifically, an optical fiber preform assembly 200 is made using an apparatus (mold assembly 100) having a rigid cylindrical outer wall 102A and a flexible inner wall 102B. The rigid cylindrical outer wall is made of aluminum having an inner diameter of 4 inches, a length of 18 inches, and a wall thickness oft/inch. The flexible inner wall is a latex rubber tube having a diameter of about 2.5 inches in the unstressed state. The top and bottom ends of the latex rubber tube are wrapped over the top and bottom ends of the aluminum cylinder. The apparatus further includes top and bottom aluminum end caps 106A, 104A, each end cap having a thickness of about 1 inch, a center hole to accommodate: (i) a core cane, (ii) two off-center holes to accommodate two mold rods 115B and (iii) four peripheral holes for accommodating threaded rods. In this exemplary embodiment the mold rods 115B are graphite mold rods (see, for example, FIG. 1A) made for with Ultrapure (Ultrafine Ac-15 or poco-200, or equivalent) available from Le Carbone (France) with a precision ground surface. In this embodiment, the graphite material of mold rods 115B has, for example, a specific gravity of 1.83, specific resistance of 12.5 μΩm, flexural strength of 62-64.1 MPa, shore hardness of 62, average grain size of 7.1 μm, and density of 1.82 g/cm$^3$. Other graphite materials may also be utilized for the mold rods. For example, in other embodiments the average graphite grain size may be somewhat larger or smaller (for example 3 to 15 microns), the density of 1.5-1.95 g/cm$^3$ (e.g., 1.65 g/cm$^3$, 1.72 g/cm$^3$, 1.83 g/cm$^3$, 1.87 g/cm$^3$, or 1.9 g/cm$^3$), shore hardness of about 60 to 78 (please note that compressive strength of graphite generally increases with its density), flexural strength of 40 MPa −80 MPa (e.g., 60-70 MPa), compressive strength of 40-120 MPa, and/or tensile strength of 2-103 Psi.

The air between the flexible inner wall and rigid outer wall is substantially removed so that the outside diameter of the flexible inner wall is essentially the same as the inside diameter of the rigid outer wall. Then a one inch think, open-pored silicone rubber foam plug $117_B$ with approximately the same diameter as the inside diameter of the rigid cylinder is inserted into the mold cavity 108 so that it is flush with the bottom of the cylinder. The bottom of the cylinder is then sealed with an aluminum end-cap and a Viton o-ring. Radially directed pressure is applied to the silica soot by pressurizing the annular cavity 108A and applying the inwardly directed pressure on the soot with the inner wall 102B. To accommodate the motion of the mold rods 115B (located off-center) towards the center of the preform when soot is under the radial pressure, the aluminum end caps 104A, 106A of this exemplary apparatus have slotted (elongated) holes. These elongated holes (e.g., bores 110A, 112A) have a width sufficient to allow the mold rod(s) to fit in, and be aligned radially (with the longer axis) toward the center of the mold cavity. The purpose of the elongated hole is to allow the mold rods 115B to be placed on the outer edge of the slot during the soot filling process, and then to traverse toward the center line as the soot is compacted radially towards the center of the mold cavity 108. In this example the slotted or elongated hole is 2.1 cm wide and its outer edge is positioned at 4.2 cm from the center of the mold cavity, and the inner edge of the slotted hole is positioned 1.7 cm from the center of the mold cavity. (For a 2.1 cm diameter mold rod, this allows 0.4 mm of movement toward the center of the mold during compaction of the soot.) A 10 mm diameter fused silica core cane is placed inside the mold cavity with its bottom end inserted into a hole at the center of the bottom plug $117_B$. The top of the core cane can be kept centered, for example by utilizing known centering devices/mechanisms or methods, for example by using a temporary centering jig, such as a centering disk made of PTFE (i.e., when all the soot is in the cavity, the disk is taken out). Alternatively a holding fixture 105' may be utilized instead (it may also be made of PTFE), and then taken out after substantially all of the soot is placed into the mold cavity 108. Two 21 mm diameter graphite mold rods 115B are then placed inside the cavity with their bottom ends inserted into slotted holes situated off-center in the bottom plug $117_B$. The graphite mold rods 115B are in contact with and are adjacent to the outer edge of the slotted holes. The tops of the mold rods are kept in their proper positions by using any of the known centering devices/mechanisms or methods. Waste silica soot from an OVD overcladding process with a tap density of 0.6 g/cc is then loaded into the cavity while occasionally tapping the size of the rigid cylinder to ensure consistent compaction of the soot. When the soot reaches a level about one inch below the top of the cylinder, the centering jig (or the holding fixture 105') is removed and a second silicone rubber foam plug $117_T$ is slid into place. The top of the cylinder is sealed, for example, with a second aluminum end-cap and Viton O-ring. The top aluminum end cap is preferably fitted with the same slot and hole arrangement as the bottom end cap, carefully aligning with the lower plate, so that radial movement of the off-center glass rods retains them parallel to the center glass core cane throughout the compaction (or the pressure application) step. The top and bottom end-caps are secured onto the ends of the cylinder by connecting them to each other with threaded rods and tightening with wing nuts. The inner cavity is then evacuated through the top end-cap. The space between the flexible wall and rigid wall can be then pressurized to 150 psig over a period of 10 minutes using a compressed air cylinder. The pressure is maintained at 150 psig for approximately 5 minutes. The inner cavity is then allowed to return to atmospheric pressure. The pressure from the annular cavity is then bled off over a period of 10 minutes through a valve on the side of the cylinder. The top end-cap is then removed and the air in the annular cavity is pumped out so that the diameter of the flexible wall is large enough to remove the top foam plug $117_T$ and the soot preform. The mold rods 115B are then removed, leaving voids 115W in the compressed soot of the soot compact 198. The resulting soot preform assembly 200 (with voids 115W therein) has a diameter of about 89 mm and a soot density of about 0.8 g/cc.

The soot preform assembly 200 is heated in a tube furnace at a rate of 5° C./minute first in a flow of 500 sccm oxygen from room temperature to 800° C. in order to remove organic contaminants and then in a flow of 500 sccm of a mixture of 5% chlorine in helium from 800 to 1200° C. to remove metallic contaminants. The cleaned preform assembly 200 is then consolidated in a vertical down-drive furnace resulting in the fully sintered optical fiber preform 210. For example, the furnace can be purged at 1000 C in 10% oxygen for one hour, then 5% chlorine for one hour, then the preform assembly 200 can be fully sintered in helium by translating at 10 mm/min from 1000° C. to 1430° C. and then 1.5 mm/min from 1430° C. to a peak of 1466° C. then back to 1430° C.

Example 3—Radial Pressing

This example is similar to Example 2, but instead of two graphite mold rods utilized in the Example 2 embodiment, two 21 mm diameter cylindrical aluminum mold rods coated with 10 μm thick coating of graphite (mold rods 115B) are placed inside the mold cavity 108 with their bottom ends inserted into holes situated off-center in the bottom of the plug $117_B$. The top of mold rods 115B can be kept in place (i.e., the rods are kept in the proper locations (so that the line connecting the centers of the rods intersect the center of the core rod) using, for example a temporary disk or the holding fixture 105' made of PTFE (Polytetrafluoroethylene). The mold cavity is then filled with silica soot. The temporary disk (or the holding fixture 105') is then removed and the top end cap 106A is put in place. Radially directed pressure is applied to the silica soot by pressurizing the annular cavity 108A and applying the inwardly directed pressure on the soot with the inner wall 102B. More specifically, the space between the flexible inner wall and the (outer rigid wall) is pressurized to about 150 psi and maintained for 5-10 minutes to press the silica soot against the mold rods 115B, and to increase the soot density. After the soot is pressed to achieve the required soot density, the top end-cap 106A is removed and the air in the annular cavity 108A is pumped out so that the diameter of the flexible wall is large enough to remove the top mold rods 115B from the soot preform and then to remove the foam plug $117_B$ and the soot preform from the mold cavity 108. The resulting soot preform has a diameter of about 89 mm. The two mold rods are carefully extracted from the compressed soot (soot compact), leaving two air holes with a diameter of 21 mm within the soot, with a soot density of about 0.8 g/cc The soot preform (optical fiber preform assembly 200) is heated in a tube furnace at a rate of 5° C./minute first in a flow of 500 sccm oxygen from room temperature to 800° C. in order to remove organic contaminants and then in a flow of 500 sccm of a mixture of 5% chlorine in helium from 800 to 1200° C. to remove metallic contaminants. The cleaned optical fiber preform assembly 200 is then consolidated in a vertical down-drive furnace to form a fully sintered optical fiber preform 210. For example, the furnace can be purged at 1000° C. in 10% oxygen for one hour, then 5% chlorine for one hour, then the preform be fully sintered in helium by translating at 10 mm/min from 1000° C. to 1430° C. and then 1.5 mm/min from 1430° C. to a peak of 1466° C. then back to 1430° C., leaving a consolidated glass article (optical fiber preform 210) with two cylindrical air holes positioned around the central core cane.

Example 4—Radial Pressing

An optical fiber preform fiber preform assembly 200 is made using an apparatus (mold assembly 100) having a rigid cylindrical outer wall and a flexible inner wall, similar to one of Example 2. The rigid cylindrical outer wall is made of aluminum having an inner diameter of 4 inches, a length of 18 inches, and a wall thickness oft/inch. The flexible inner wall is a latex rubber tube having a diameter of about 2.5 inches in the unstressed state. The top and bottom ends of the latex rubber tube are wrapped over the top and bottom ends of the aluminum cylinder. The apparatus further includes top and bottom aluminum end caps 106A and 104A, each end cap having a thickness of about 1 inch. However, in this exemplary embodiment, while the end caps 104A and 106A have four peripheral holes for accommodating threaded rods 120, but do not have the holes/bores for situating the core cane or the mold rods therein. Referring to FIG. 6 instead of holes/bores 110, 110A, 112, 112A, each of the end caps 106A, 104A of this embodiment utilizes cups 110', 110A', 112', 112A' to accommodate a centrally located core cane 115 and a plurality (e.g., two) of mold rods 115B. In this embodiment the end caps 104A, 106A have a thickness of about 1 inch.

The air between the flexible inner wall and rigid outer wall is substantially removed, as described in Example 2 embodiment so that the outside diameter of the flexible inner wall is essentially the same as the inside diameter of the rigid outer wall. Then a one inch think, open-pored silicone rubber foam plug 117$_B$ with approximately the same diameter as the inside diameter of the rigid cylinder is inserted into the cavity so that it is flush with the bottom of the cylinder. The bottom of the cylinder is then sealed with an aluminum end-cap and a Viton o-ring. A 10 mm diameter fused silica core cane 115 is placed inside the mold cavity 108 with its bottom end inserted into the receiving cup 112' situated at the center of the bottom end cap 104A. The top of the core cane can be kept centered, for example by utilizing known centering devices/mechanisms or methods, for example by using a holding fixture 105' made of PTFE (i.e., when all the soot is in the cavity, the holding fixture 105' is taken out). Two 20 mm diameter graphite mold rods 115B are then placed inside the cavity with their bottom ends inserted into the holding/receiving cups 112A' of the bottom cap 104A. In this example the inner edge of the mold rods 115B are positioned 1.7 cm from the center of the mold cavity. The top of the mold rods is kept in their proper positions, for example, by a holding fixture 105'. Waste silica soot from an OVD overcladding process with a tap density of 0.6 g/cc is then loaded into the cavity while occasionally tapping the size of the rigid cylinder to ensure consistent compaction of the soot. When the soot reaches a level about one inch below the top of the cylinder, the holding fixture 105' is removed and a second (top) foam plug 117$_T$ (e.g., silicone rubber foam plug 117$_T$) may be slid into place. The top of the cylinder is sealed, for example, with a second aluminum end-cap and Viton O-ring. The top aluminum end cap is carefully aligned with the lower plate 103 and the bottom end cap 106A. The top and bottom end-caps are secured onto the ends of the cylinder by connecting them to each other with threaded rods 120 and tightening with wing nuts. The inner cavity is then evacuated through the top end-cap 106A. The space between the flexible wall 102B and rigid wall 102A can be then pressurized to 150 psig over a period of 10 minutes using a compressed air cylinder. The pressure is maintained at 150 psig for approximately 5 minutes. The inner cavity (mold cavity 108) is then allowed to return to atmospheric pressure. The pressure from the annular cavity 108A is then bled off over a period of 10 minutes through a valve on the side of the cylinder. The top end-cap is then removed and the air in the annular cavity is pumped out so that the diameter of the flexible wall 102B is large enough to remove the top foam plug 117$_T$ and the soot preform. The resulting soot preform has a diameter of about 89 mm and a density of about 0.8 g/cc.

The soot preform is heated in a tube furnace at a rate of 5° C./minute first in a flow of 500 sccm oxygen from room temperature to 800° C. in order to remove organic contaminants and then in a flow of 500 sccm of a mixture of 5% chlorine in helium from 800 to 1200° C. to remove metallic contaminants. The cleaned preform is then consolidated in a vertical down-drive furnace. For example, the furnace can be purged at 1000 C in 10% oxygen for one hour, then 5% chlorine for one hour, then the preform can be fully sintered in helium by translating at 10 mm/min from 1000° C. to ° C. and then 1.5 mm/min from 1430° C. to a peak of 1466 C then back to 1430° C.

Example 5—Radial Pressing

This example is also similar to Example 2. In this embodiment two 21 mm diameter cylindrical aluminum mold rods with a 1.5 μm amorphous carbon (a-c) coatings thereon are placed inside the cavity with their bottom ends inserted into holes situated off-center of the bottom plug 117$_B$. (Note: these coatings can be made as thin as 0.1 μm)

The top of mold rods are kept in the proper locations (so that the line connecting the centers of the mold rods 115B intersects the center of the core rod) by using any known mechanism or method(s). The annular cavity 108A is pressurized to apply, via the wall 102B inwardly (and radially) directed pressure on the silica soot situated in the mold cavity 108. Then the top end cap 106A is removed and the air in the annular cavity 108A is pumped out so that the diameter of the flexible wall 102B is large enough to remove the top foam plug 117$_T$ and the soot preform. The resulting soot preform assembly 200 has a diameter of about 89 mm. The two mold rods 115B can be carefully extracted from the optical fiber preform 200 assembly, leaving two air holes with a diameter of 20 mm and surrounded by compacted soot 198 with a soot density of about 0.8 g/cc. The air holes are then filled with a particulate glass, for example boron doped glass powder. Preferably the powder should have a tap density equal to the pressed density of the soot. A tapered glass plug (not shown) can be fitted into the bottom of the air holes, and the boron doped glass powder filled into the air holes. In another configuration, a thin wall silica tube having a diameter slightly less than 21 mm, can first be fitted in the air hole, and then itself be plugged and filled with the boron doped glass powder.

The soot preform assembly, including either the glass powder or silica tube(s) filled with glass powder, is heated in a tube furnace at a rate of 5° C./minute first in a flow of 500 sccm oxygen from room temperature to 800° C. in order to remove organic contaminants and then in a flow of 500 sccm of a mixture of 5% chlorine in helium from 800 to 1200° C. to remove metallic contaminants. The cleaned preform is then consolidated in a vertical down-drive furnace. For example, the furnace can be purged at 1000° C. in 10% oxygen for one hour, then 5% chlorine for one hour, then the preform can be fully sintered in helium by translating at 10 mm/min from 1000° C. to at 1000° C. in 10% oxygen for one hour, then 5% chlorine for one hour, then the preform can be fully sintered in helium by translating at 10 mm/min from 1000° C. to ° C. and then 1.5 mm/min from 1430° C. to a peak of 1466° C. then back to 1430° C.

The boron-doped soot consolidates with the compacted, resulting in the final sintered optical fiber preform 210 with boron doped stress rods situated within the cladding portion of the preform.

Example 6—Radial Pressing

This example is similar to Example 4, but unlike of example two 20 mm diameter consolidated core rods (or core canes) 115 are placed into the air hole regions formed by the removal or the mold rods 115B from the soot preform assembly. After the pressed soot preform assembly 200 is removed from the inner cavity 108, the resulting soot preform assembly 200 has a diameter of about 89 mm and a soot density of about 0.8 g/cc.

The soot preform assembly 200 with multiple core rods is then heated in a tube furnace at a rate of 5° C./minute first in a flow of 500 sccm oxygen from room temperature to 800° C. in order to remove organic contaminants and then in a flow of 500 sccm of a mixture of 5% chlorine in helium from 800 to 1200° C. to remove metallic contaminants. The cleaned preform assembly 200 with multiple core rods therein is then consolidated in a vertical down-drive furnace, forming a fully sintered (consolidated) optical fiber preform 210 with multiple core portions situated therein. For example, the furnace can be purged at 1000 C in 10% oxygen for one hour, then 5% chlorine for one hour, then the preform can be fully sintered in helium by translating at 10 mm/min from 1000° C. to ° C. and then 1.5 mm/min from 1430° C. to a peak of 1466° C. then back to 1430° C. Multiple core fibers can then be drawn from the optical fiber preform 210.

According to at least one embodiment the method includes the steps of:
(I) place a plurality of rods into a mold cavity of an apparatus, wherein at least one of the plurality of rods is selected from a group consisting of:
  (i) a graphite rod; (ii) a metal or ceramic rod having a coating, the coating comprising at least one of: a metal, ceramic rod having a coating, the coating comprising at least one of: graphite, graphene, amorphous silicon (a-silicon), amorphous carbon (a-c); xylan flouropolymer, composites of xylan with other polymers (for example, Kynar®, Halar®, Eterna®), diamond-like carbon(s) or (DLCs), boron nitride, molydisulfide (molybdenum disulfide), and tungsten disulfide, electroless nickel infused with Teflon, nickel infused with SiC;
(II) placing particulate glass material in the mold cavity between the rods and an inner wall of the mold cavity; and
(III) applying pressure against the particulate glass material to pressurize the particulate glass material against the plurality of rods.

Diamond-like carbon (DLC) is a class of amorphous carbon material that displays some of the typical properties of diamond. DLC is usually applied as a coating to other materials that could benefit from some of those properties, and is available commercially, for example from Northeast Coating Technologies of Kennebunk, Me.

According to at least one embodiment the method includes the steps of:
(i) placing a plurality of rods into a mold cavity of an apparatus, wherein at least two of the plurality of rods comprises a rod having an outer surface with a coefficient of friction $0.05 \leq COF \leq 0.3$;
(ii) placing particulate glass material in the mold cavity between the rods and an inner wall of the mold cavity; and
(iii) applying pressure against the particulate glass material to pressurize the particulate glass material against the plurality of rods.

According to some embodiments $0.05 < COF < 0.2$, or even $0.05 < COF < 0.12$.

According to at least one embodiment the method includes the steps of:
(i) placing a plurality of rods into a mold cavity of an apparatus, wherein at least two of the plurality of rods comprises a rod with a coating situated thereon, the coating having a thickness of 0.1 to 100 microns (e.g., 0.1 to 2 microns) and an outer surface with a coefficient of friction $COF \leq 0.3$;
(ii) placing particulate glass material in the mold cavity between the rods and an inner wall of the mold cavity; and
(iii) applying pressure against the particulate glass material to pressurize the particulate glass material against the plurality of rods.

In some embodiments the coefficient of friction COF of the mold rods 115B is $\leq 0.3$. In some embodiments the coefficient of friction COF of the mold rods 115B is $\leq 0.25$. In some embodiments the coefficient of friction COF of the mold rods 115B is $\leq 0.25$. In some embodiments the coefficient of friction $COF \leq 0.2$. In some embodiments the coefficient of friction $COF \leq 0.15$. In some embodiments $COF \leq 0.12$ and in some embodiments $COF \leq 0.1$. For example, in some embodiments COF may be between 0.05 and 0.3, between 0.05 and 0.2, between 0.05 and 0.015, or between 0.05 and 0.012, or, for example, between 0.09 and 0.2.

For example, depending on form, MoS2 (Molybdenum disulfide) low friction coatings typically range between 5 to 15 micrometer. Sputtering techniques can produce thin films of MoS2 low friction coatings of 0.2 micrometer thick, and plasma sprays can produce thin films of MoS2 low friction coatings of beginning at 0.003 inch or more (76.2 microns or more). However, MoS2 coatings are prone to water absorption, while amorphous silicon (a-silicon) and amorphous carbon (a-c) coatings are not; thus one may have to determine which is more important: longer wear life or better performance. In addition, the low friction coatings for the plurality of mold rods 115B may comprise Teflon and be made with about $0.05 \leq COF \leq 0.08$ (in thicknesses of not greater than 100 microns, preferably 20 microns or less (e.g. 0.5 to 2 μm). (It is noted that pure Teflon coatings (COF of 0.04) may have a high wear abrasion, and may separate from the metal or ceramic substrate material (i.e., from the metal or ceramic portion of the mold rods) if the thickness of the Teflon coating is >100 μm). Another type of coating is an Electroless Nickel infused with Teflon. This combination of Nickel and Teflon gives good wear resistance and can have COF of about 0.06. Boron nitride (e.g. BN) coatings may also be utilized in making mold rods 115B. Such coatings have low coefficients of friction (e.g., COF similar to that of graphite and molybdenum) and provide excellent lubrication properties during the removal of mold rods from the compressed soot. Hexagonal boron nitride (BN) has a crystal lattice of hexagonal rings forming thin parallel planes. Atoms of boron (B) and nitrogen (N) are covalently bonded to other atoms in the plane with the angle 120° between two bonds (each boron atom is bonded to three nitrogen atoms and each nitrogen atom is bonded to three boron atoms). Friction forces cause the particles of boron nitride to orient in the direction in which the planes are parallel to the sliding movement. The anisotropy of the mechanical properties imparts the combination of low coefficient of friction and high carrying load capacity to boron nitride. Boron nitride forms a lubrication film strongly adhered to the substrate surface. The lubrication film provides good wear resistance and seizure resistance compatibility. Boron nitride coatings may be deposited on metal or ceramic rods by powder spray methods, painting, aerosol deposition, plasma spray on methods for those skilled in the art.

The mold rods 115B may also comprise coatings made from xylan flouropolymer, composites of xylan with other polymers, diamond-like carbon(s), boron nitride, molydisulfide (molybdenum disulfide), tungsten disulfide, electroless nickel infused with Teflon, or nickel infused with SiC (silicon carbide). These coatings can be 0.1 to 100 μm thick. These coatings can have COF≤0.12. For example, in some embodiments COF may be between 0.02 to 0.12. In other embodiments COF is between 0.05 and 0.15, or 0.05 and 0.12.

According to some embodiments a method of making an optical fiber comprises the steps of:
(I) placing a plurality of rods into a mold cavity of an apparatus, wherein at least one of the plurality of rods is (i) a graphite rod; or (ii) a metal or ceramic rod having a coating, the coating comprising at least one of: graphite, graphene, amorphous silicon (a-silicon), an amorphous carbon (a-c); xylan flouropolymer, composites of xylan with other polymers, diamond-like carbon (DLC), boron nitride, molydisulfide (molybdenum disulfide), tungsten disulfide, electroless nickel infused with Teflon, nickel infused with SiC;
(II) placing particulate glass material in the mold cavity between the rods and an inner wall of the mold cavity;
(III) applying pressure against the particulate glass material to pressurize the particulate glass material against the plurality of rods, and forming a soot compact;
(IV) removing the least one of the plurality of rods from the soot compact, thereby forming a at least one void within the soot compact;
(V) inserting at least one glass rod into the at least one void, and forming an optical fiber preform assembly;
(VI) sintering the optical fiber preform assembly and forming the optical fiber preform; and
(VII) drawing an optical fiber from the optical fiber preform.

According to at least one embodiment a method of making an optical fiber comprises the steps of:
(I) placing a plurality of rods into a mold cavity of an apparatus, wherein at least two of the plurality of rods comprise an outer surface with a coefficient of friction 0.02≤COF≤0.3;
(II) placing particulate glass material in the mold cavity between the rods and an inner wall of the mold cavity;
(III) applying pressure against the particulate glass material to pressurize the particulate glass material against the plurality of rods, and forming a soot compact;
(IV) removing the least one of the plurality of rods from the soot compact, thereby forming a at least one void within the soot compact;
(V) inserting at least one glass rod into the at least one void, and forming an optical fiber preform assembly;
(VI) sintering the optical fiber preform assembly and forming the optical fiber preform; and
(VII) drawing an optical fiber from the optical fiber preform.

According to at least one embodiment a method of making an optical fiber comprises the steps of:
(I) placing a plurality of rods into a mold cavity of an apparatus, wherein at least two of the plurality of rods comprise an outer surface with a coefficient of friction 0.02≤COF≤0.3;
(II) placing particulate glass material in the mold cavity between the rods and an inner wall of the mold cavity;
(III) applying pressure against the particulate glass material to pressurize the particulate glass material against the plurality of rods, and forming a soot compact;
(IV) removing the at least two of the plurality of rods from the soot compact, thereby forming at least two voids within the soot compact, thus forming an optical preform assembly with at least two voids corresponding to the removed mold rods; and
(V) sintering the optical fiber preform assembly and forming the optical fiber preform; and
(VI) drawing from the optical fiber preform an optical fiber with at least two voids parallel to fiber's axis.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for forming an optical fiber preform comprising the steps of:
(I) placing a plurality of rods into a mold cavity of an apparatus, wherein at least one of the plurality of rods is a metal or ceramic rod having a coating, the coating comprising at least one of: amorphous silicon (a-silicon), xylan flouropolymer, composites of xylan with other polymers, molydisulfide (molybdenum disulfide), tungsten disulfide, electroless nickel infused with Teflon, nickel infused with SiC;
(II) placing particulate glass material in the mold cavity between the rods and an inner wall of the mold cavity; and
(Ill) applying pressure against the particulate glass material to press the particulate glass material against the plurality of rods.

2. The method of claim 1, wherein at least one of the plurality of rods has an outer surface with a coefficient of friction COF ≤0.3.

3. The method of claim 2, wherein at least one of the plurality of rods has an outer surface with a coefficient of friction COF ≤0.15.

4. The method of claim 2, wherein at least one of the plurality of rods has an outer surface with a coefficient of friction COF ≤0.1.

5. The method of claim 2, wherein at least two of the plurality of rods are graphite rods, and wherein at least one of the plurality of rods is a core cane situated therebetween.

6. The method for making an optical fiber preform according to claim 1, wherein the pressure is applied at least radially inwards against the particulate glass material to pressurize the particulate glass material against the plurality of rods.

7. The method of claim 1, wherein prior to the step of applying pressure against the particulate glass material, the particulate glass material has an average density of from 0.1 to 0.5 grams per cubic centimeter and wherein subsequent to the step of applying pressure against the particulate glass material, the pressed particulate glass material has a density of from 0.6 to 1.2 grams per cubic centimeter.

8. The method of claim 1, wherein the step of applying pressure against the particulate glass material comprises the step of applying radial pressure, and wherein prior to the step of applying pressure against the particulate glass material, the particulate glass material has an average density of from 0.1 to 0.5 grams per cubic centimeter and wherein subsequent to the step of applying a radial pressure against the particulate glass material, the pressed particulate glass material has a density of from 0.6 to 1.2 grams per cubic centimeter.

9. A method for making an optical fiber preform comprising the steps of:
   placing a plurality of rods into a mold cavity of an apparatus, wherein at least two of the plurality of rods comprise an outer surface comprising at least one of the following coatings: amorphous silicon (a-silicon), Teflon, xylan flouropolymer, composites of xylan with other polymers, molydisulfide (molybdenum disulfide), tungsten disulfide, electroless nickel infused with Teflon, nickel infused with SiC;
   placing particulate glass material in the mold cavity between the rods and an inner wall of the mold cavity; and
   applying pressure against the particulate glass material to press the particulate glass material against the plurality of rods.

10. The method of claim 9, wherein 0.05≤COF ≤0.3.

11. The method for making an optical fiber preform according to claim 9, wherein the pressure is applied at least radially inwards against the particulate glass material to press the particulate glass material against the plurality of rods.

12. The method for making an optical fiber preform according to claim 9, wherein the plurality of rods comprises: (i) at least one glass rod; and (ii) at least two mold rods; and said pressure is applied axially and/or radially.

13. The method for making an optical fiber preform according to claim 9, wherein the apparatus comprises an outer wall, the outer wall surrounding the inner wall; the pressure is applied at least radially inwards, and the pressure has a magnitude from 25 psig to 250 psig.

14. The method of claim 9, wherein at least one of the plurality of rods is a core cane situated along the axial center of the mold cavity.

15. The method of claim 9, wherein at least one of the plurality of rods comprises a consolidated core cane surrounded by a porous soot clad layer and the core cane is situated along the axial center of said mold cavity.

16. The method of claim 9, wherein prior to the step of applying a radial pressure against the particulate glass material, the particulate glass material has an average density of from 0.1 to 0.5 grams per cubic centimeter and wherein subsequent to the step of applying a radial pressure against the particulate glass material, the pressed particulate glass material has a density of from 0.6 to 1.2 grams per cubic centimeter.

17. The method of claim 9 wherein the plurality of rods are arranged co-linearly within the mold cavity.

18. A method of making an optical fiber, the method comprising the steps of:
   (I) placing a plurality of rods into a mold cavity of an apparatus, wherein at least one of the plurality of rods is a metal or ceramic rod having a coating thereon, the coating comprising at least one of: amorphous silicon coating (a-silicon), xylan flouropolymer, composites of xylan with other polymers, molydisulfide (molybdenum disulfide), tungsten disulfide, electroless nickel infused with Teflon, nickel infused with SiC;
   (II) placing particulate glass material in the mold cavity between the rods and inner wall of the mold cavity;
   (III) forming a soot compact by applying pressure against the particulate glass material to press the particulate glass material against the plurality of rods;
   (IV) removing the least one of said plurality of rods from the soot compact, thereby to format least one void within the soot compact;
   (V) forming an optical fiber preform assembly by inserting at least one glass rod into the at least one void;
   (VI) forming the optical fiber preform by sintering the optical fiber preform; and
   (VII) drawing an optical fiber from the optical fiber preform.

19. A method of making an optical fiber, the method comprising the steps of:
   (I) placing a plurality of rods into a mold cavity of an apparatus, wherein at least two of the plurality of rods comprise an outer surface comprising at least one of the following coatings: amorphous silicon (a-silicon), Teflon, xylan flouropolymer, composites of xylan with other polymers, molydisulfide (molybdenum disulfide), tungsten disulfide, electroless nickel infused with Teflon, nickel infused with SiC, wherein the outer surface has a coefficient of friction COF, and 0.02≤COF≤0.3;
   (II) placing particulate glass material in the mold cavity between the rods and an the inner wall of the mold cavity;
   (III) forming a soot compact by applying pressure against the particulate glass material to press the particulate glass material against the plurality of rods, and;
   (IV) removing at least two of the plurality of rods from the soot compact to form at least two voids within the soot compact;
   (V) forming an optical fiber preform assembly by inserting at glass rods into said voids;
   (VI) forming the optical fiber preform by sintering the optical fiber preform assembly; and
   (VII) drawing an optical fiber from the optical fiber preform.

20. A method of making an optical fiber, the method comprising the steps of:
   (I) placing a plurality of rods into a mold cavity of an apparatus, wherein at least two of the plurality of rods comprise an outer surface comprising at least one of the following coatings: amorphous silicon (a-silicon), Teflon, xylan flouropolymer, composites of xylan with other polymers, molydisulfide (molybdenum disulfide), tungsten disulfide, electroless nickel infused with Teflon, nickel infused with SiC, wherein the outer surface has a coefficient of friction COF, and 0.02<COF<0.3;
   (II) placing particulate glass material in the mold cavity between the rods and an inner wall of the mold cavity;

(III) forming a soot compact by applying pressure against the particulate glass material to press the particulate glass material against the plurality of rods, and;
(IV) forming an optical preform assembly by removing the at least two of the plurality of rods from the soot compact to form at least two voids within the soot compact;
(V) sintering the optical fiber preform assembly and forming the optical fiber preform; and
(VI) drawing an optical fiber from the optical fiber preform.

* * * * *

UNITED STATES PATENT AND TRADEMARK OFFICE
CERTIFICATE OF CORRECTION

PATENT NO. : 10,407,337 B2
APPLICATION NO. : 15/631808
DATED : September 10, 2019
INVENTOR(S) : Daniel Robert Boughton et al.

It is certified that error appears in the above-identified patent and that said Letters Patent is hereby corrected as shown below:

On the Title Page

On page 2, in Column 1, item [56], Other Publications, Line 9, delete ""Assymetry" and insert -- "Asymmetry --, therefor.

On page 2, in Column 2, item [56], Other Publications, Line 4, delete "Appproach" and insert -- Approach --, therefor.

On page 2, in Column 2, item [56], Other Publications, Line 20, delete "Lithographylithography" and insert -- Lithography --, therefor.

In the Claims

Column 40, Line 44, Claim 1, delete "flouropolymer," and insert -- fluoropolymer, --, therefor.

Column 40, Line 51, Claim 1, delete "(Ill)" and insert -- (III) --, therefor.

Column 41, Line 28, Claim 9, delete "flouropolymer," and insert -- fluoropolymer, --, therefor.

Column 41, Line 38, Claim 10, delete "COF ≤0.3." and insert -- COF≤0.3. --, therefor.

Column 42, Line 10, Claim 18, delete "flouropolymer," and insert -- fluoropolymer, --, therefor.

Column 42, Line 15, Claim 18, delete "(Ill)" and insert -- (III) --, therefor.

Column 42, Line 35, Claim 19, delete "flouropolymer," and insert -- fluoropolymer, --, therefor.

Column 42, Line 41, Claim 19, delete "an the" and insert -- the --, therefor.

Signed and Sealed this
Twenty-fifth Day of February, 2020

Andrei Iancu
*Director of the United States Patent and Trademark Office*

Column 42, Line 61, Claim 20, delete "flouropolymer," and insert -- fluoropolymer, --, therefor.

Column 42, Line 65, Claim 20, delete "0.02<COF<0.3;" and insert -- 0.02≤COF≤0.3; --, therefor.